US008935444B2

(12) United States Patent
Umeo et al.

(10) Patent No.: US 8,935,444 B2
(45) Date of Patent: Jan. 13, 2015

(54) REMOTE CONTROL METHOD OF EXTERNAL DEVICES

(75) Inventors: Tatsuya Umeo, Hamamatsu (JP); Takao Yamamoto, Hamamatsu (JP); Masaaki Okabayashi, Hamakita (JP); Hideo Miyamori, Hamakita (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/505,384

(22) Filed: Jul. 17, 2009

(65) Prior Publication Data

US 2009/0307395 A1 Dec. 10, 2009

Related U.S. Application Data

(62) Division of application No. 11/030,830, filed on Jan. 7, 2005.

(30) Foreign Application Priority Data

Jan. 15, 2004 (JP) ................................ 2004-008096
Jan. 15, 2004 (JP) ................................ 2004-008103
Jan. 15, 2004 (JP) ................................ 2004-008107

(51) Int. Cl.
*G06F 3/00* (2006.01)
*G06F 13/12* (2006.01)

(Continued)

(52) U.S. Cl.
CPC ............... *G08C 19/00* (2013.01); *H04H 60/04* (2013.01); *H04H 60/95* (2013.01)

(Continued)

(58) Field of Classification Search
USPC ............. 710/1, 61–62, 8, 10, 14–15, 72, 104; 370/226, 324; 235/472.01, 492; 84/477 R, 609, 454, 461, 601, 615; 709/208, 237–238, 248, 221; 707/204, 707/513; 719/318
See application file for complete search history.

(56) References Cited

U.S. PATENT DOCUMENTS 5,209,560 A 5/1993 Taylor et al.
5,457,478 A 10/1995 Frank (Continued)

FOREIGN PATENT DOCUMENTS

EP 0 785 539 A1 7/1997
EP 1 061 658 A2 12/2000

(Continued)

OTHER PUBLICATIONS

Japanese Office Action, dated Apr. 3, 2007 for JP Application No. P2004-008103.

(Continued)

*Primary Examiner* — Farley Abad
*Assistant Examiner* — Henry Yu
(74) *Attorney, Agent, or Firm* — Morrison & Foerster LLP

(57) ABSTRACT

A method of controlling a plurality of external devices is performed on a computer which is set up with a plurality of remote control processes corresponding to the plurality of the external devices, and a management process for managing the remote control processes while communicating with the remote control processes. The management process is called to display icons corresponding to the remote control processes in a display field provided by the management process. Further, the management process acts when a specified operation is applied to one of the icons on the display field for sending a screen open instruction to one of the remote control processes corresponding to the icon to which the specified operation is applied. The remote control process which receives the screen open instruction is activated to display a control screen for use in remotely controlling the corresponding external device.

14 Claims, 14 Drawing Sheets

(51) Int. Cl.

| | |
|---|---|
| ***G06F 13/00*** | (2006.01) |
| ***G10G 7/02*** | (2006.01) |
| ***G10G 3/00*** | (2006.01) |
| ***G09B 15/00*** | (2006.01) |
| ***G10H 7/00*** | (2006.01) |
| ***G06F 15/16*** | (2006.01) |
| ***G06F 15/177*** | (2006.01) |
| ***G08C 19/00*** | (2006.01) |
| ***H04H 60/04*** | (2008.01) |
| *H04H 60/95* | (2008.01) |

(52) U.S. Cl.

USPC .......... 710/61; 710/1; 710/8; 710/10; 710/14; 710/15; 710/62; 710/72; 710/104; 84/454; 84/461; 84/477 R; 84/601; 84/615; 709/208; 709/221; 709/237; 709/248; 719/318

(56) References Cited

U.S. PATENT DOCUMENTS

| | | | | |
|---|---|---|---|---|
| 5,616,879 | A | 4/1997 | Yamauchi et al. | |
| 5,805,812 | A * | 9/1998 | Fish et al. | 709/208 |
| 5,825,336 | A * | 10/1998 | Fujita et al. | 345/2.3 |
| 5,892,938 | A | 4/1999 | Eastty et al. | |
| 5,945,986 | A | 8/1999 | Bargar et al. | |
| 6,023,016 | A | 2/2000 | Tamura et al. | |
| 6,103,965 | A | 8/2000 | Kumagai et al. | |
| 6,180,863 | B1 | 1/2001 | Tamura et al. | |
| 6,272,108 | B1 * | 8/2001 | Chapman | 370/226 |
| 6,281,420 | B1 * | 8/2001 | Suzuki et al. | 84/477 R |
| 6,463,390 | B1 | 10/2002 | Miyamori et al. | |
| 6,545,587 | B1 * | 4/2003 | Hatakeyama et al. | 340/3.31 |
| 6,556,219 | B1 * | 4/2003 | Wugofski | 715/762 |
| 6,560,655 | B1 * | 5/2003 | Grambihler et al. | 709/248 |
| 6,651,084 | B1 | 11/2003 | Kelley et al. | |
| 6,725,262 | B1 * | 4/2004 | Choquier et al. | 709/221 |
| 6,725,281 | B1 * | 4/2004 | Zintel et al. | 719/318 |
| 6,994,259 | B2 * | 2/2006 | Watters | 235/472.01 |
| 7,315,791 | B2 * | 1/2008 | Ilic et al. | 702/125 |
| 7,327,699 | B1 * | 2/2008 | Schafer | 370/324 |
| 2001/0045819 | A1 | 11/2001 | Harris et al. | |
| 2002/0023530 | A1 | 2/2002 | Komano et al. | |
| 2002/0078075 | A1 * | 6/2002 | Colson et al. | 707/204 |
| 2002/0083098 | A1 * | 6/2002 | Nakamura | 707/513 |
| 2002/0112070 | A1 * | 8/2002 | Ellerbrock et al. | 709/238 |
| 2002/0156547 | A1 | 10/2002 | Suyama et al. | |
| 2002/0189428 | A1 * | 12/2002 | Okamura et al. | 84/609 |
| 2002/0193894 | A1 | 12/2002 | Terada et al. | |
| 2003/0018805 | A1 * | 1/2003 | Meyerson | 709/237 |
| 2003/0147727 | A1 * | 8/2003 | Fujishima et al. | 414/200 |
| 2004/0054802 | A1 | 3/2004 | Beauchamp et al. | |
| 2004/0124247 | A1 * | 7/2004 | Watters | 235/492 |
| 2004/0215816 | A1 * | 10/2004 | Hayes et al. | 709/238 |
| 2005/0132256 | A1 | 6/2005 | Watanabe et al. | |
| 2005/0144330 | A1 * | 6/2005 | Richardson | 710/1 |
| 2005/0159832 | A1 | 7/2005 | Umeo et al. | |
| 2007/0227342 | A1 * | 10/2007 | Ide et al. | 84/645 |
| 2008/0034297 | A1 | 2/2008 | Correll et al. | |
| 2008/0178202 | A1 * | 7/2008 | Blackman et al. | 719/327 |
| 2010/0306667 | A1 | 12/2010 | Umeo et al. | |

FOREIGN PATENT DOCUMENTS

| | | | |
|---|---|---|---|
| EP | 1 061 708 | A2 | 12/2000 |
| JP | 07-236200 | | 9/1995 |
| JP | 9-258736 | | 10/1997 |
| JP | 11-327560 | | 11/1999 |
| JP | 2000-081883 | | 3/2000 |
| JP | 2001-519072 | | 10/2001 |
| JP | 2003-319008 | A | 11/2003 |
| WO | WO-98/53392 | | 11/1998 |
| WO | WO-03/096682 | A1 | 11/2003 |

OTHER PUBLICATIONS

Owner's Manual, "Studio Manager for DM 2000 V1.1", Yamaha Corporation (Japanese and English translations).

Japanese Office Action mailed Jul. 8, 2008 for JP Application No. 2004-008096.

Japanese Office Action mailed Jul. 8, 2008 for JP Application No. 2004-008107.

Japanese Office Action mailed Apr. 3, 2007 for JP Application No. 2004-008103.

Japanese Office Action mailed Dec. 5, 2006 for JP Application No. 2004-008096.

Japanese Office Action mailed Dec. 5, 2006 for JP Application No. 2004-008107.

Japanese Office Action mailed Dec. 5, 2006 for JP Application No. 2004-008103.

Notification of Reasons for Refusal mailed Mar. 14, 2012, for JP Application No. 2009-249564, with English Translation, eight pages.

European Search Report dated Jun. 7, 2013, for European Patent Application No. 05100018, two pages.

Final Office Action mailed Aug. 17, 2010, for U.S. Appl. No. 11/030,830, filed Jan. 7, 2005, 12 pages.

Non-Final Office Action mailed Nov. 24, 2009, for U.S. Appl. No. 11/030,830, filed Jan. 7, 2005, nine pages.

Non-Final Office Action mailed Oct. 14, 2011, for U.S. Appl. No. 11/030,830, filed Jan. 7, 2005, 13 pages.

Non-Final Office Action mailed May 7, 2013, for U.S. Appl. No. 11/030,830, filed Jan. 7, 2005, 14 pages.

Non-Final Office Action mailed Jul. 22, 2013, for U.S. Appl. No. 12/855,554, filed Aug. 12, 2010, 51 pages.

Final Office Action mailed Nov. 18, 2013, for U.S. Appl. No. 11/030,830, filed Jan. 7, 2005, 17 pages.

* cited by examiner

REMOTE CONTROL METHOD OF EXTERNAL DEVICES

This application is a division of U.S. patent application Ser. No. 11/030,830, filed Jan. 7, 2005, the entire disclosure of which is incorporated herein by reference.

BACKGROUND OF THE INVENTION

1. Technical Field

The present invention relates to a method, an apparatus, and a program for controlling external devices, more specifically and preferably, for remotely controlling mixers, sound modules, and the like.

2. Related Art

The music software such as a sequencer can be installed in personal computers and the like, and can transmit a MIDI signal to external sound module apparatuses and the like. An external sound module apparatus synthesizes a musical sound signal based on the MIDI signal. The synthesized musical sound signal is mixed with other audio signals via a mixer and the like. A mixing result is recorded on a recording apparatus. According to this form of operations, it is convenient to enable the personal computer to remotely control various external devices such as the sound module, the mixer, and the like. Various external device manufacturers provide the remote control software to enable personal computers to control these external devices. Such a technology is disclosed for example in Instruction manual for Studio Manager for DM2000 V1.1, YAMAHA CORPORATION, January 2002.

The remote control software secures a separate memory area (called parameter memory) in the memory space of the personal computer. The secured memory area is treated as a memory devoted to an external device to be controlled. The remote control software has a setup window displaying images that simulate a monitor screen and an operation panel on the external device. Using a mouse and the like, a user can operate graphic controls displayed on the operation panel image. Based on the operation result, the software updates corresponding operation parameters in the parameter memory. Of the external device operations, the personal computer emulates operations related to editing of parameter values in the memory. The personal computer and the external device interchanges updated contents of the operation parameters to maintain the consistency of the operation parameters between the computer and the external device.

The remote control software can save the current operation parameters as a "setup file" in a recording medium such as a hard disk. The remote control software can load the previously stored "setup file" to reproduce the past state of the external device. When the above-mentioned music software has the plug-in function, the remote control software for controlling external devices can be installed as plug-ins of the music software. In this case, the music software's menu screen can be used to open a parameter edit screen for each remote control software.

In a first view of the prior art, the above-mentioned technology can allow a personal computer to install many pieces of remote control software that can be plugged in the music software. Consequently, the music software's menu screen lists many pieces of remote control software. In many cases, only a part of these software modules are actually needed for specific situations. If all the plugged-in remote control software modules are displayed for choices, it is inconvenient to select necessary ones. Further, if the same remote control software is used to control a plurality of external devices of the same type, the remote control setting must be changed for each of the devices. It has been impossible to concurrently control the same type of the external devices.

According to the above-mentioned technology, operation parameters need to be individually loaded or saved for each of the remote control software. It has been impossible to load or save operation parameters at once for a plurality of remote control software for the following reason. Let us consider that a particular software is activated to set necessary operation parameters for an external device, and then the remote control software's setup window is closed. Closing the setup window frees the parameter memory for the remote control software.

When a plurality of external devices are used simultaneously, they are provided with operation parameters whose setup states are often interrelated with each other. For example, an output signal of one device is often used as an input signal of another device. A plurality of devices often share resources such as a MIDI port. In these cases, a plurality of setup files applied to these devices must be used as "one set" at the same time. According to the above-mentioned technology, however, users must manage combinations of the setup files. The management has been very complicated.

In a second view of the prior art, when operation parameters are loaded from the setup file to the remote control software, a synchronization operation needs to be performed to secure the consistency between the content of the parameter memory in the personal computer and the content of the other parameter memory provided in the external device. The synchronization operation may be available in two modes. One is to "copy parameters from the external device to the personal computer". The other is to "copy parameters from the personal computer to the external device". For this reason, a user needs to initiate the synchronization operation by specifying the synchronization direction for each of remote control software, making user operations complicated.

When synchronization operations are performed for a plurality of remote control software, a certain amount of time is required until all the synchronization operations are complete. During this wait time, it has been difficult for a user to determine whether or not the synchronization operation is complete for each external device, and to grasp how fur the synchronization progresses with respect to an external device for which the synchronization operation is not yet completed. There is a demand that the synchronization operation should be canceled for some of the external devices depending on the synchronization progress. When the synchronization operation is performed for a plurality of external devices, the synchronization may need to be completed for some devices prior to others.

In a third view of the prior art, the personal computer can generally provides a capability of hieratical plug-ins of the software. For example, it is possible to plug a second software in a first software (music software) and further plug a third software in the second software. In such case, there is no direct plug-in relationship between the first and third software. It has been difficult to perform inter-process communication between the first and third software.

When the third software is the remote control software for external devices, for example, the first software such as music application software cannot instruct the third software to display the setup window, conventionally. The remote control software generally controls external devices via a MIDI port. The first software cannot assign a control MIDI port and the like to the remote control software, conventionally. Likewise, the first software cannot be notified of a MIDI port used by the remote control software, conventionally.

SUMMARY OF THE INVENTION

The present invention has been made in consideration of the foregoing. It is therefore a first object of the present invention to provide a method, an apparatus, and a program for controlling external devices so as to easily manage associated remote control software. It is a second object of the present invention to provide a method, an apparatus, and a program for controlling external devices capable of easily and fast performing processes for a plurality of external devices. It is a third object of the present invention to provide a method, an apparatus, and a program for controlling external devices capable of operating associated software in cooperation with each other.

To solve the above-mentioned problems and to achieve the above-noted objects of the invention, the present invention is characterized by having the following constitutions.

In a first aspect of the invention, a method of controlling a plurality of external devices is performed on a computer which is set up with a plurality of remote control processes corresponding to the plurality of the external devices, and a management process for managing the remote control processes while communicating with the remote control processes. The method comprises the steps of: using the management process to display icons corresponding to the remote control processes in a display field provided by the management process; using the management process when a specified operation is applied to one of the icons on the display field, for sending a screen open instruction to one of the remote control processes corresponding to the icon to which the specified operation is applied; and using the remote control process which receives the screen open instruction to display a control screen for use in remotely controlling the corresponding external device.

Another inventive method of controlling a plurality of external devices is performed on a computer which is set up with a plurality of remote control processes corresponding to the plurality of the external devices, and a management process for managing the remote control processes while communicating with the remote control processes. The inventive method comprises the steps of: activating the management process to display icons corresponding to the remote control processes in a display field provided by the management process for remotely controlling the external devices; allowing the management process when a save instruction operation is detected, for collecting first parameters representing current states of the external devices from the respective remote control processes corresponding to the icons displayed on the display field; and combining second parameters representing a current state of the management process with the collected first parameters of the external devices to produce a setup file, and saving the setup file on a recording medium.

A still another inventive method of controlling a plurality of external devices is performed on a computer which is set up with a plurality of remote control processes corresponding to the plurality of the external devices, and a management process for managing the remote control processes while communicating with the remote control processes. The inventive method comprises the steps of: activating the management process when a load instruction operation is detected, for reading a setup file containing parameters defining states of the external devices; initiating the remote control processes corresponding to the external devices whose parameters are contained in the read setup file; supplying the initiated remote control processes with the parameters contained in the read setup file for controlling the corresponding external devices; and allowing the management process to display icons corresponding to the initiated remote control processes in a display field provided by the management process.

Preferably, these inventive methods further comprises the steps of: first allowing the management process to register a remote control process corresponding to an external device which should be managed by the management process, the remote control process being set up on the computer based on a remote control program installed in the computer; and second allowing the management process to display an icon corresponding to the registered remote control process in the display field provided by the management process.

Preferably, the step of first allowing can register two or more remote control processes for remotely controlling two or more external devices of the same type independently from each other, each of the two or more remote control processes being set up on the computer separately from each other based on the same remote control program installed in the computer.

The first aspect of the invention includes an apparatus capable of performing these inventive methods of controlling external devices.

The first aspect of the invention also includes a program for use in an apparatus having a processor, the program being executable by the processor for causing the apparatus to perform these inventive methods of controlling external devices.

In a second aspect of the invention, a method of remotely controlling a plurality of external devices is performed on a computer which is set up with a plurality of remote control processes corresponding to the plurality of the external devices, and a management process for managing the remote control processes while communicating with the remote control processes, each remote control process being allocated with a parameter memory area for storing a configuration state of the corresponding external device. The inventive method comprises: a synchronization instruction step of allowing the management process to send a synchronization instruction simultaneously to the respective remote control processes; and a total recall synchronization step of allowing the respective remote control processes to perform a synchronization operation in parallel to each other based on the synchronization instruction so as to synchronize the configuration state stored in each parameter memory area allocated to each remote control process and an actual state of the corresponding external device.

Preferably, the inventive method further comprises a synchronization direction instruction step of selecting and specifying either a first synchronization direction of adjusting the actual state of the external device to the configuration state stored in the parameter memory area of the corresponding remote control process or a second synchronization direction of adjusting the configuration state stored in the parameter memory area of the remote control process to the actual state of the corresponding external device, so that the total recall synchronization step causes the respective remote control processes to perform the synchronization operation in the same synchronization direction as selected and specified by the synchronization direction instruction step.

Preferably, the inventive method further comprises a synchronization availability determination step of determining individually whether or not each of the remote control processes performs the synchronization operation in the total recall synchronization step.

Preferably in these inventive methods, each of the parameter memory areas of the remote control processes stores the configuration state of the corresponding external device in the form of various parameters which are divided into a number of groups. In such a case, these inventive methods further comprise a synchronization group setup step of allowing each remote control process to select and set one or more of the groups of the parameters subjected to the synchronization operation in the total recall synchronization step.

Preferably, the inventive methods further comprises a total recall synchronization confirmation step of displaying confirmation information before commencing the total recall synchronization step, the confirmation information indicating the remote control processes which have been determined by the synchronization availability determination step to perform the synchronization operation in the total recall synchronization step.

Preferably in the inventive method, the total recall synchronization step includes: a step of allowing the remote control processes to notify the management process of a progress of each synchronization operation performed by the respective remote control processes; and a list screen display step of allowing the management process to display a list screen showing the progresses of the synchronization operations performed by the respective remote control processes during the total recall synchronization step.

Preferably in the inventive method, the total recall synchronization step comprises the steps of: enabling the management process to detect a stop operation applied to a particular one of the remote control processes; sending a stop instruction to the particular remote control process in response to the detected stop operation; and causing the particular remote control process to receive the stop instruction and to stop the synchronization operation.

Further preferably, the inventive method comprises: a step of prioritizing at least one of the plurality of the remote control processes; and a prioritized synchronization step of enabling the prioritized remote control process to perform the synchronization operation prior to the total recall synchronization step, so that the total recall synchronization step is conducted for the remaining remote control processes after termination of the prioritized synchronization step.

The second aspect of the invention includes an apparatus capable of performing these inventive methods of controlling external devices.

The second aspect of the invention also includes a program for use in an apparatus having a processor, the program being executable by the processor for causing the apparatus to perform these inventive methods of controlling external devices.

In a third aspect of the invention, a method of controlling a plurality of external devices is performed on a computer which is set up with a plurality of remote control processes corresponding to the plurality of the external devices, a management process for managing the remote control processes while communicating with the remote control processes and an application process for conducting an application work using the external devices while communicating with the management process. In the inventive method, the application process performs: a first display step of displaying a screen of the application work provided with a plurality of graphic controls corresponding to the plurality of the external devices; and a step of sending an issuance request instruction to the management process when an operation is applied to one of the graphic controls provided in the screen of the application work. The management process performs: a step of issuing a display instruction in response to the issuance request instruction from the application process; and a step of sending the issued display instruction to one of the remote control processes corresponding to the graphic control to which the operation is applied. Said one remote control process performs: a step of receiving the display instruction sent from the management process; and a second display step of displaying a remote operation screen in response to the display instruction for use in remote control of the corresponding external device.

Another inventive method of controlling a plurality of external devices is performed on a computer which is set up with a plurality of remote control processes corresponding to the plurality of the external devices, a management process for managing the remote control processes while communicating with the remote control processes and an application process for conducting an application work with allocating resources to the remote control processes while communicating with the management process. In the inventive method, the management process performs the steps of: receiving information indicating a first group of resources which are available for the application work from the application process; holding a second group of resources among the first group of the resources for use in the remote control processes managed by the management process; notifying the respective remote control processes of information indicating a third group of resource(s) which is included in the second group of the resources but which excludes resources already used by the respective remote control processes, hence the third group of the resource(s) includes one or more resources allocatable to the respective remote control processes; and receiving information indicating a fourth group of resource(s) containing one or more of allocated resources from the respective remote control processes.

Still another inventive method of controlling a plurality of external devices is performed on a computer which is set up with a plurality of remote control processes corresponding to the plurality of the external devices, a management process for managing the remote control processes while communicating with the remote control processes and an application process for conducting at least a reproduction work of a music piece using resources while communicating with the management process. In the inventive method, the application process performs the steps of: allocating a resource to each of plural tracks of the music piece; outputting musical performance information reproduced from the plural tracks of the music piece in accordance with the respective resources allocated to the respective tracks; receiving resource information from the management process, the resource information indicating a group of resources used by the respective remote control processes; identifying an external device in response to a request for displaying a remote operation screen of one track based on the resource allocated to said one track and the resource information received from the management process, the identified external device being supplied with the musical performance information reproduced from said one track in accordance with the allocated resource; and sending an issuance request instruction to the management process for requesting an issuance of a display instruction to one remote control process corresponding to the identified external device. The management process performs the steps of: collecting the resource information from the respective remote control processes, the resource information indicating the group of the resources used by the respective remote control processes; and issuing the display instruction to said one remote control process in response to the issuance request instruction. Said one remote control process performs the step of: displaying a remote operation screen in response to the display instruction from the management process, so that the external device corresponding to said one track can be remotely controlled on the displayed remote operation screen.

A further inventive method of controlling a plurality of external devices is performed on a computer which is set up with a plurality of remote control processes corresponding to the plurality of the external devices, a management process for managing the remote control processes while communicating with the remote control processes and an application process for conducting an application work using the external devices while communicating with the management process. In the inventive method, the application process performs a step of sending an issuance request instruction to the management process for requesting an issuance of an operation instruction to one of the remote control processes managed by the management process. The management process performs a step of issuing the operation instruction in response to the issuance request instruction from the application process, and transferring the operation instruction to said one remote control process, the operation instruction specifying an operation to be performed by said one remote control process. Said one remote control process performs the specified operation in response to the operation instruction sent from the management process.

Preferably in the inventive method, the application process further performs the steps of: sending a request instruction to the management process when a save operation is detected for requesting state information about a current state; combining data maintained in the application process with the information about the current state supplied from the management process in response to the request instruction; and saving a setup file containing combined results of the data of the application process and the information of the management process. The management process further performs the steps of: collecting first parameters representing current states of the remote control processes from the respective remote control processes in response to the request instruction from the application process; and combining the collected first parameters with second parameters representing a current state of the management process; and supplying the application process with combined results of the first and second parameters as the information about the current state.

Preferably in the inventive method, the application process further performs the steps of: reading a setup file when a load operation is detected, the read setup file containing configuration data specifying a state of the management process and states of the remote control processes; and supplying the management process with the configuration data. The management process further performs the steps of: initiating one or more of the remote control process associated with parameters described in the configuration data; and supplying the initiated remote control process with the parameters described in the configuration data.

Preferably, in the inventive method, the management process performs the step of transferring the operation instruction specifying the operation including at least one of: a synchronization operation to synchronize a current state of said one remote control process with a current state of the corresponding external device controlled by said one remote control process; and a display operation to display a remote operation screen for use in remote control of the external device corresponding to said one remote control process.

Preferably in these inventive methods, the remote control process is plugged in the management process so that the application process indirectly manages the remote control process through the intermediate management process, or alternatively the remote control process may be plugged in the application process so that the application process directly manages the remote control process.

Preferably in these inventive methods, the management process performs a step of registering a remote control process managed by the management process based on a remote control program installed in the computer.

The third aspect of the invention includes an apparatus capable of performing these inventive methods of controlling external devices.

The third aspect of the invention also includes a program for use in an apparatus having a processor, the program being executable by the processor for causing the apparatus to perform these inventive methods of controlling external devices.

In this manner, according to the first aspect of the invention, the management process detects a specified operation for any of icons, and outputs a screen open instruction to the corresponding remote control process. According to this constitution, a user can select an intended control screen using icons corresponding to various remote control processes. The displayed icons correspond to parameters contained in the setup file. Accordingly, a user can easily determine the remote control process parameter to be edited.

When detecting a specified save instruction operation, the management process collects the first parameters from each remote control process and combines the collected first parameters with the second parameters for saving. According to this constitution, all of the associated parameters can be stored in one file for integrated management.

A plurality of remote control processes can be registered based on one remote control program. This construction can simultaneously and parallel control the same type of a plurality of external devices if connected.

As mentioned above, according to the second aspect of the invention, the management process sends a specified synchronization instruction to each remote control process. Based on the supplied synchronization instruction, the remote control processes perform synchronization operations to concurrently synchronize the states of the parameter memory areas managed by the remote control processes with the states of the external devices corresponding to the remote control processes. According to this constitution, the management process can easily and fast perform synchronization operations for a plurality of external devices.

According to the third aspect of the invention, in response to a specified operation on the application process screen, it is possible to issue an instruction to a management process so as to allow a remote control process managed by the management process to display the remote operation screen. This constitution makes it possible to instruct the remote control process to be displayed on the monitor from the application process screen.

The management process secures the second group of resources out of the first group of resources so that the second group of resources is used for remote control processes managed by the management process. The respective remote control processes are notified of information indicating a third group of resources which exclude resources already used for the remote control processes among the second group of resources. According to this construction, each remote control process can select a resource to be used by the remote control process from the second group of resources collectively secured by the management process. It is possible to decrease a communication amount between the remote control process and the application program. In addition, the remote control process can improve a response to resource setup procedure.

The application process receives information indicating a group of resources from the management process. An issuance request instruction is sent to the management process so as to issue a display instruction. According to this construction, the application process can obtain, from the management process, the information about resources used by remote control processes managed by the management process.

The application process sends an issuance request instruction to the management process. In response to the issuance request instruction, the management process issues an operation instruction to the remote control process. According to this constitution, the application process can allow the management process to perform a specified operation for a remote control process managed by that management process. Each remote control process receives the same operation instruction as that received from the application process when the application process directly manages the remote control process. The conventional remote control process can be used as it is.

When detecting a save instruction operation, the application process sends a request instruction to the management process. According to this constitution, the application process can obtain the information about current states from the management processes managing a plurality of remote control processes in the same procedure when the application process directly manages a remote control process That is to say, with respect to acquisition of the information about current states of the external devices, the application process need not be aware that the management process manages the plurality of remote control processes.

When detecting a load instruction operation, the application process reads one composite setup file containing setup data specifying states of the management process and the plurality of remote control processes. The application process then supplies the management process with the setup data. According to this constitution, the application process can supply the setup data to the management process managing a plurality of remote control processes in the same procedure when the application process directly manages a remote control processes. That is to say, with respect to the system configuration based on the setup data, the application process need not be aware that the management process manages the plurality of remote control processes.

Further, the application process can directly manage each remote control process. According to this constitution, the remote control process managed by the management process is the same as the remote control process (remote control plug-in) managed by the ordinary application process. It is possible to effectively use already created program resources for plug-ins. In addition, a plurality of plug-ins can be managed collectively, which would be troublesome according to the management using a conventional application process.

Moreover, the management process can register a multiple of remote control processes managed by the management process based on a common remote control program installed in the computer. According to this constitution, it is possible to freely select remote control processes collectively managed by the management process based on the remote control program stored in the storage of the computer.

BRIEF DESCRIPTION OF THE INVENTION

Figure 3A:
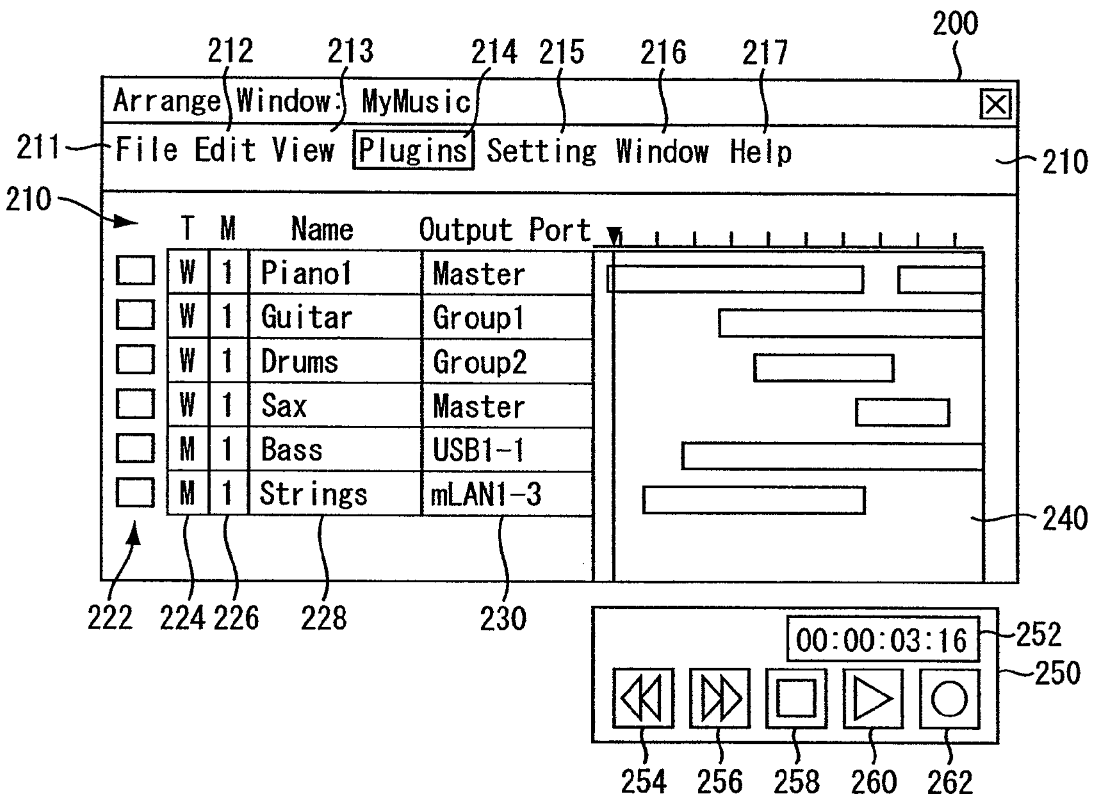
Figure 3B:
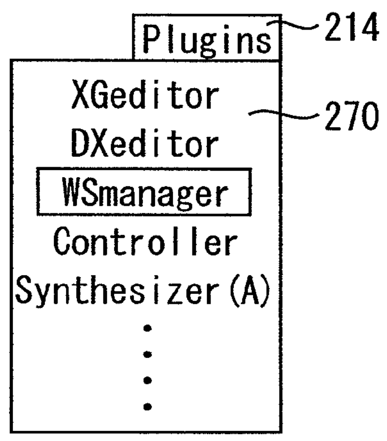
Figure 4A:
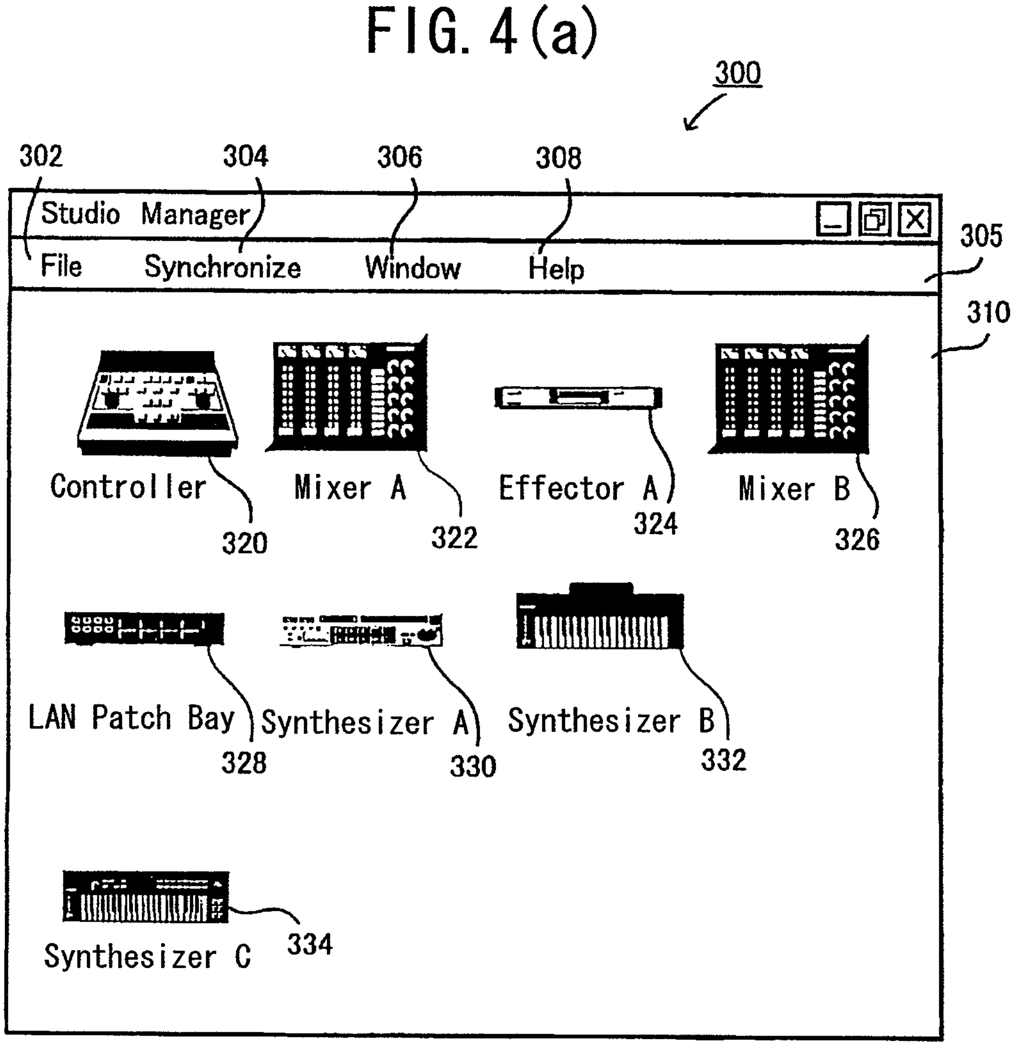
Figure 4B:
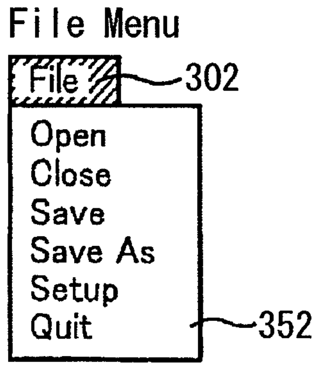
Figure 4C:
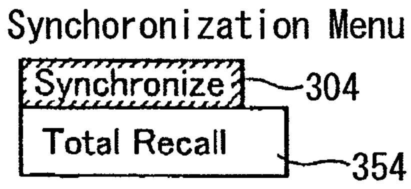
Figure 4D:
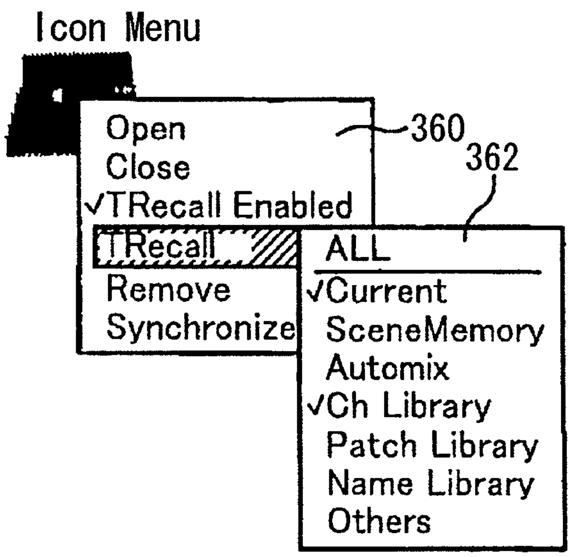

FIGS. 3(*a*) and 3(*b*) are diagrams showing a music software window.

FIGS. 4(*a*) through 4(*d*) are diagrams showing a workspace management window.

Figure 5A:
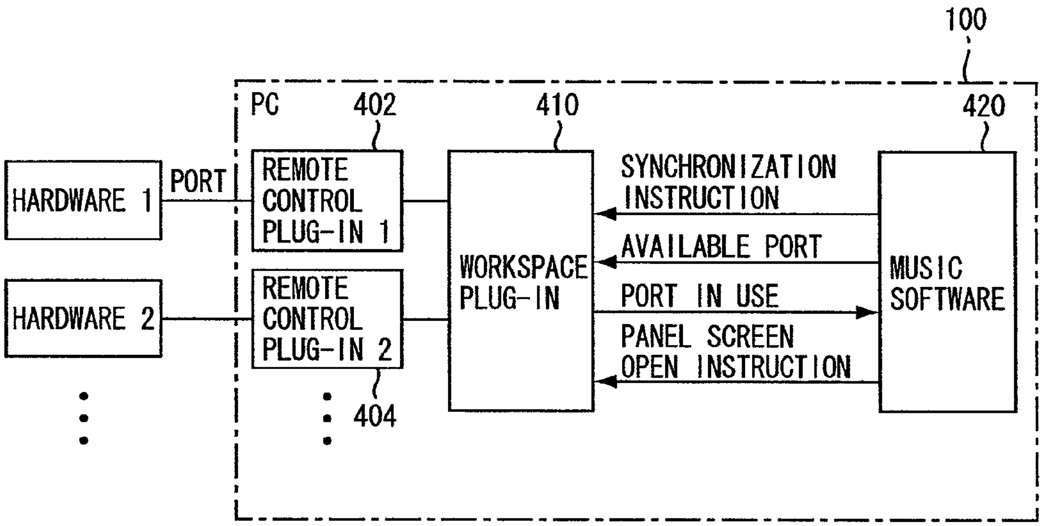
Figure 5B:
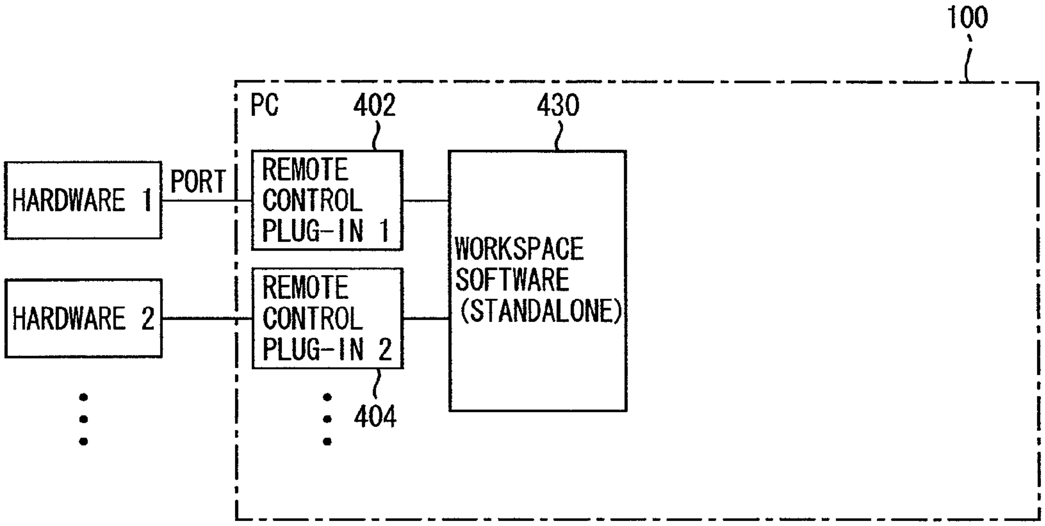

FIGS. 5(*a*) and 5(*b*) are block diagrams showing a total configuration of software modules according to the embodiment.

Figure 6:
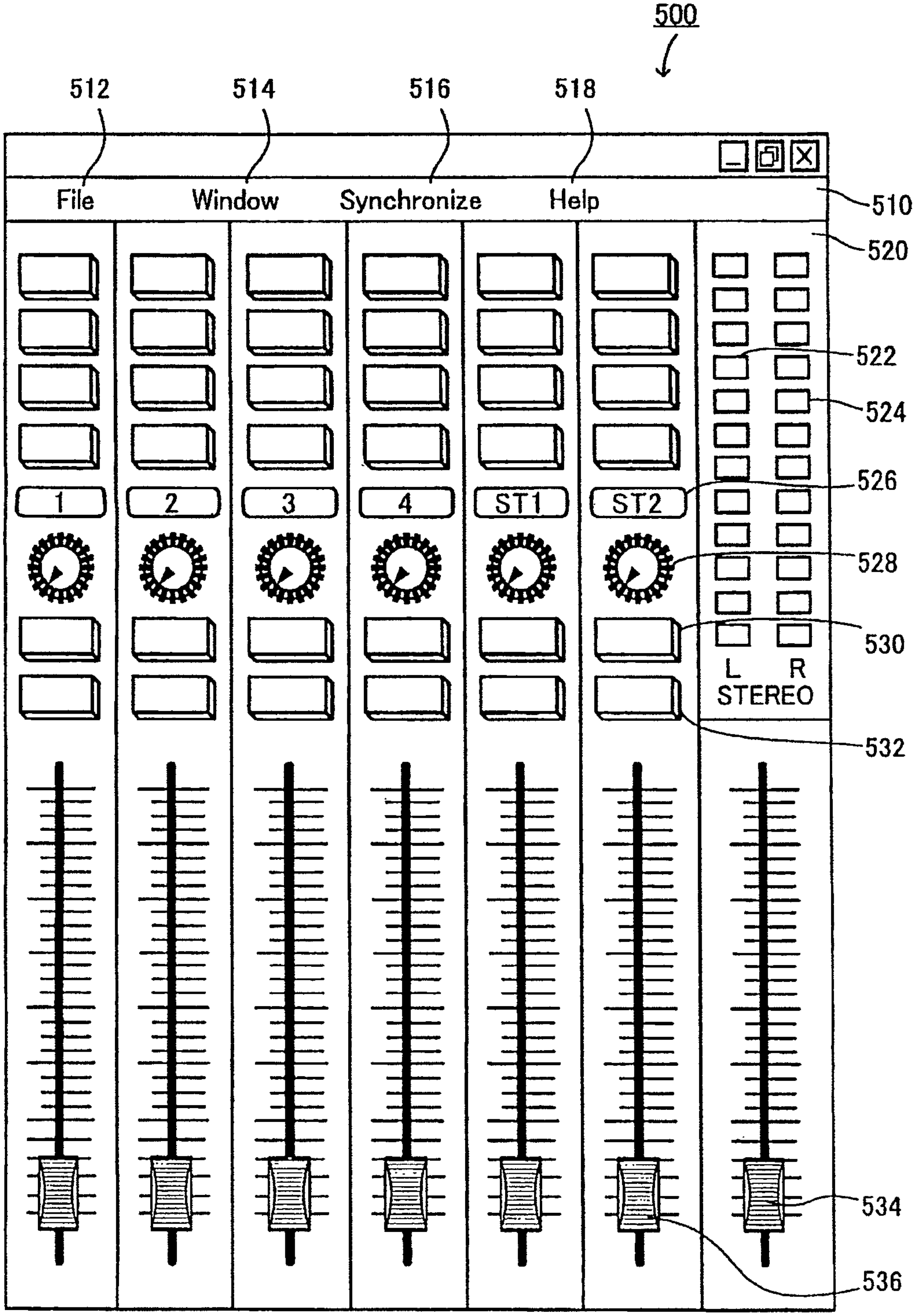

FIG. 6 is a diagram showing a remote control plug-in panel window.

Figure 7:
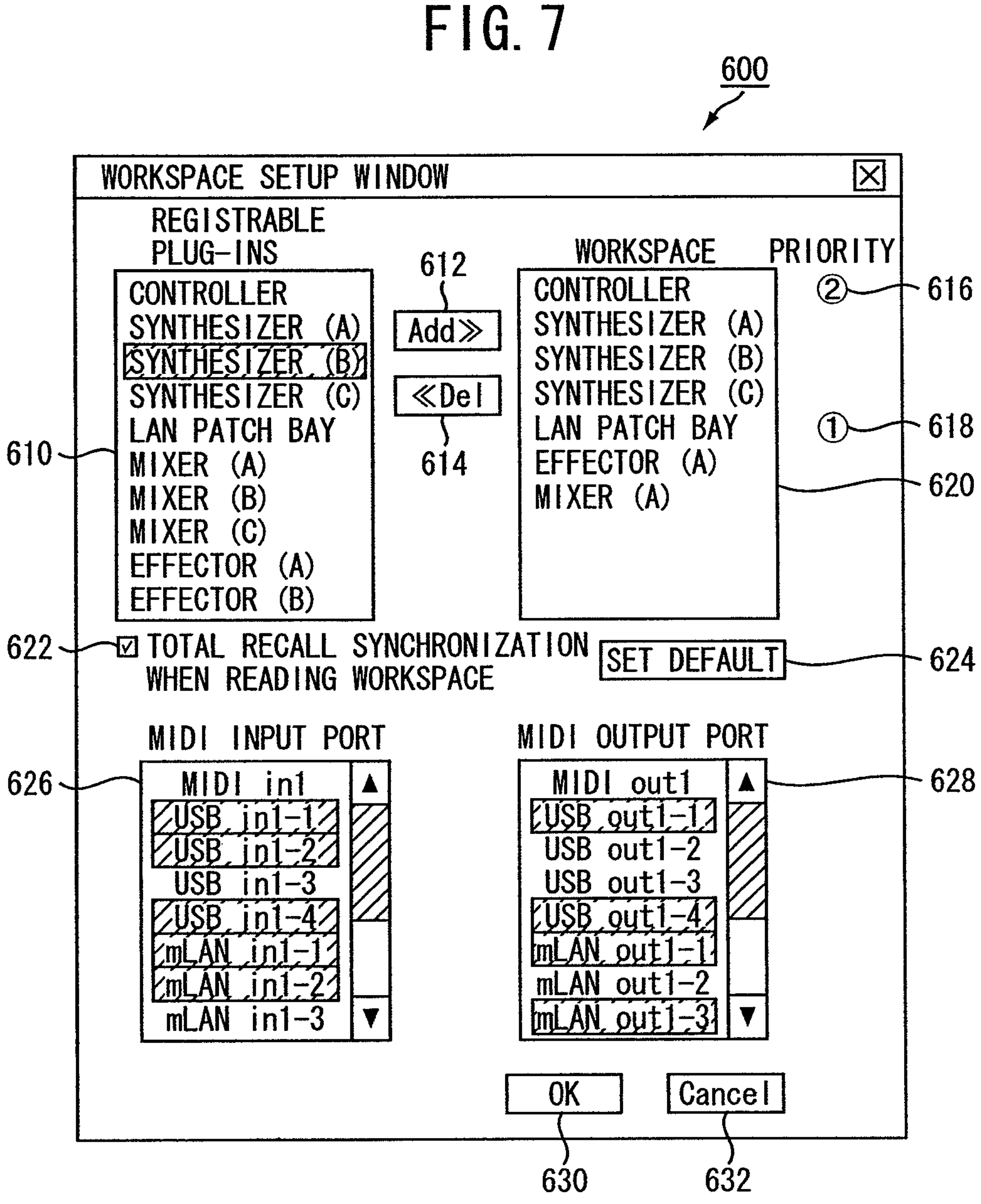

FIG. 7 is a diagram showing a workspace setup window.

Figure 8:
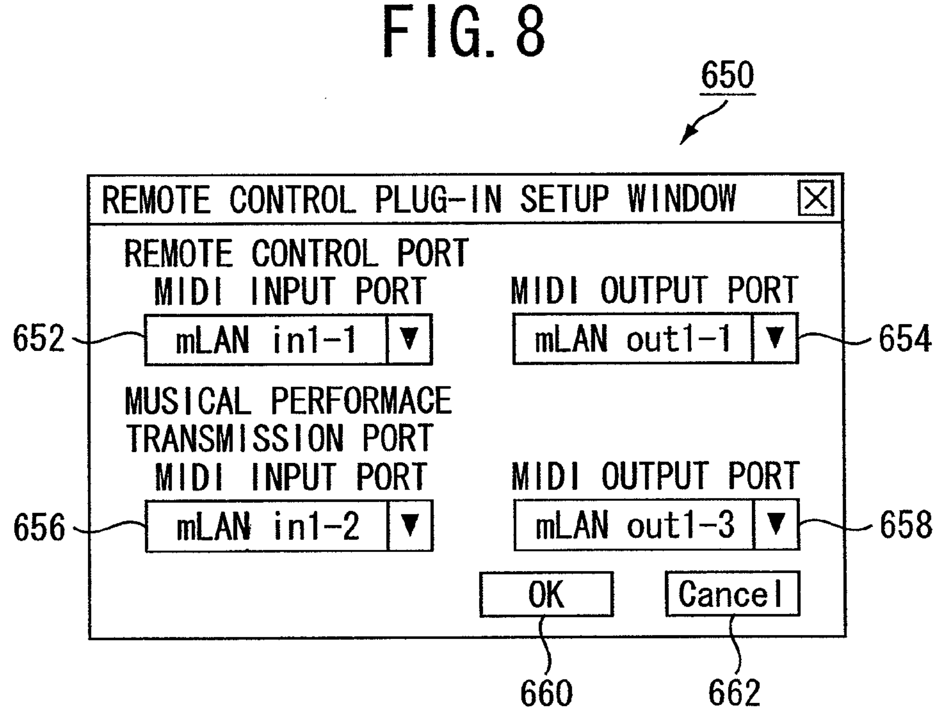

FIG. 8 is a diagram showing a remote control plug-in setup window.

Figure 9A:
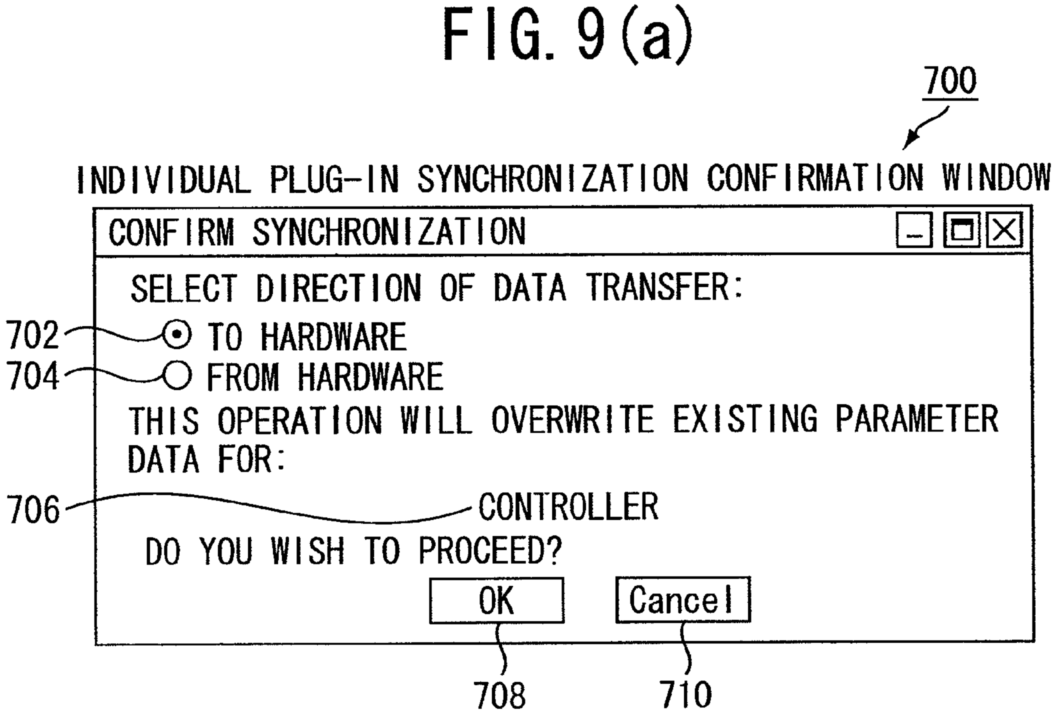
Figure 9B:
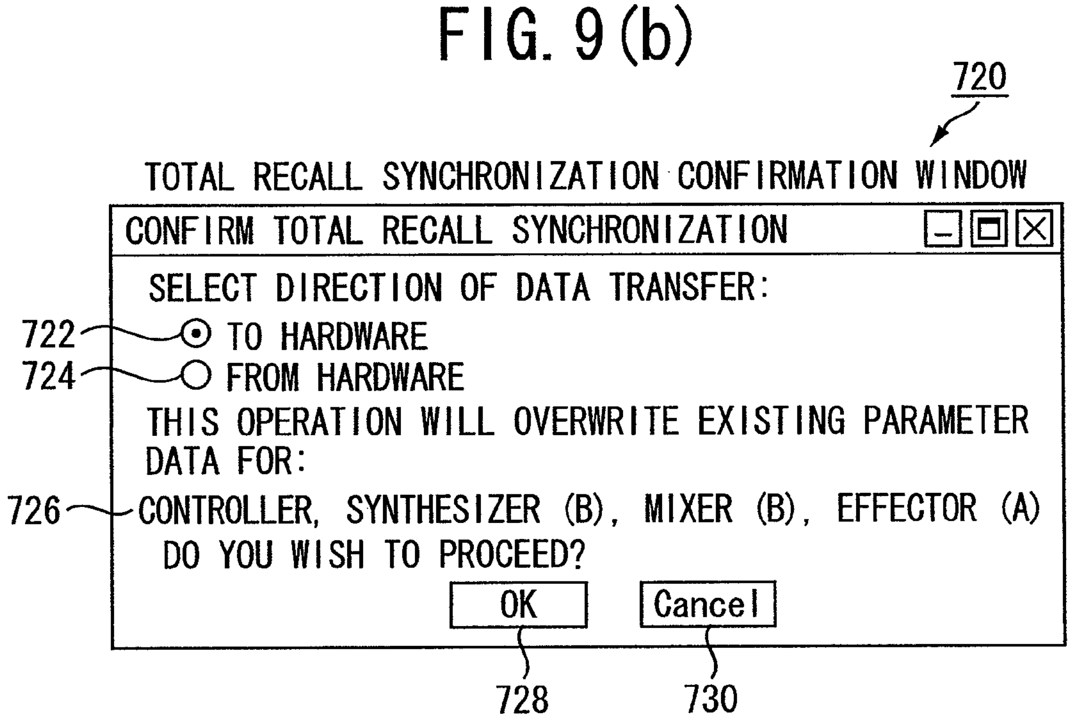
Figure 9C:
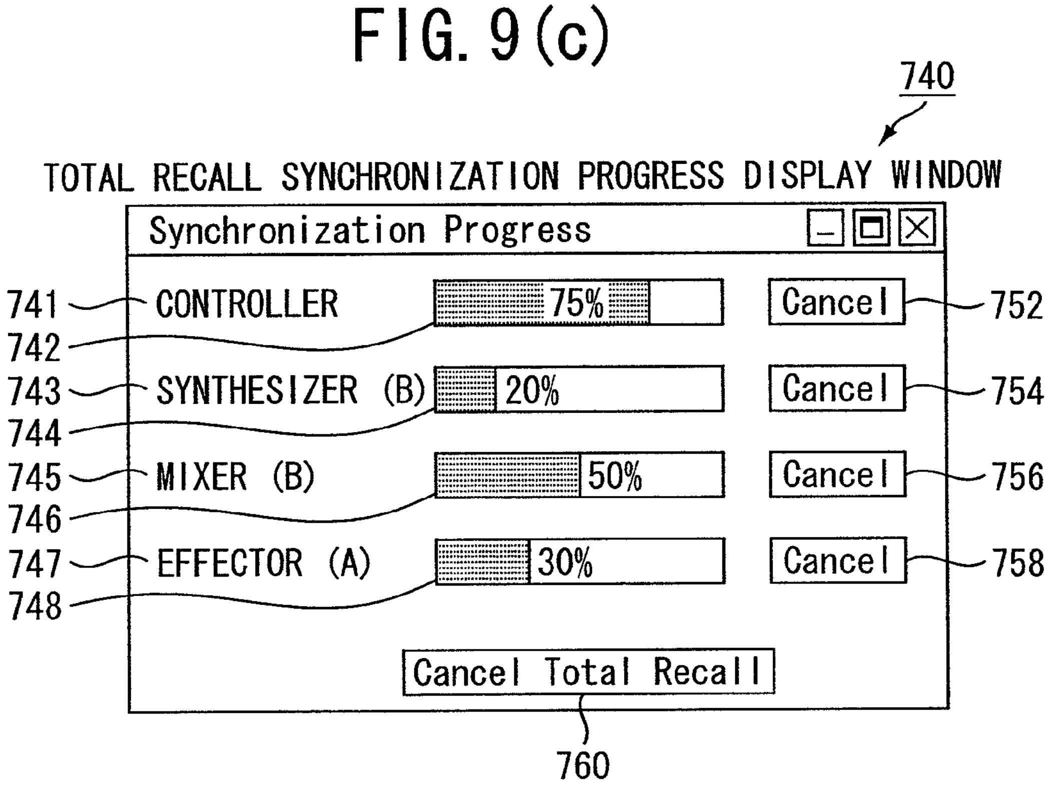

FIGS. 9(*a*), 9(*b*) and 9(*c*) are diagrams showing various windows displayed during a synchronization operation.

Figure 10A:
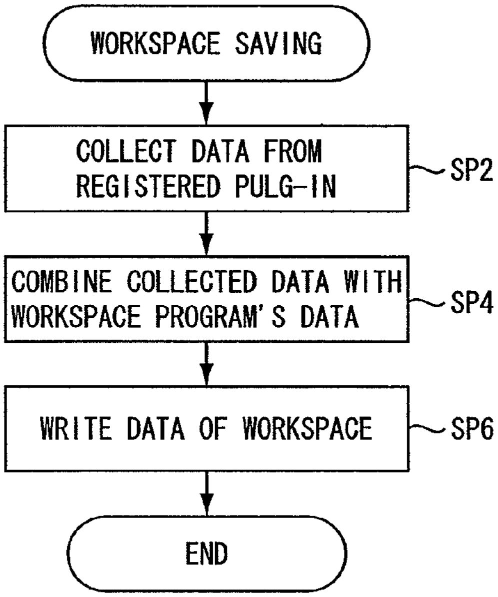
Figure 10B:
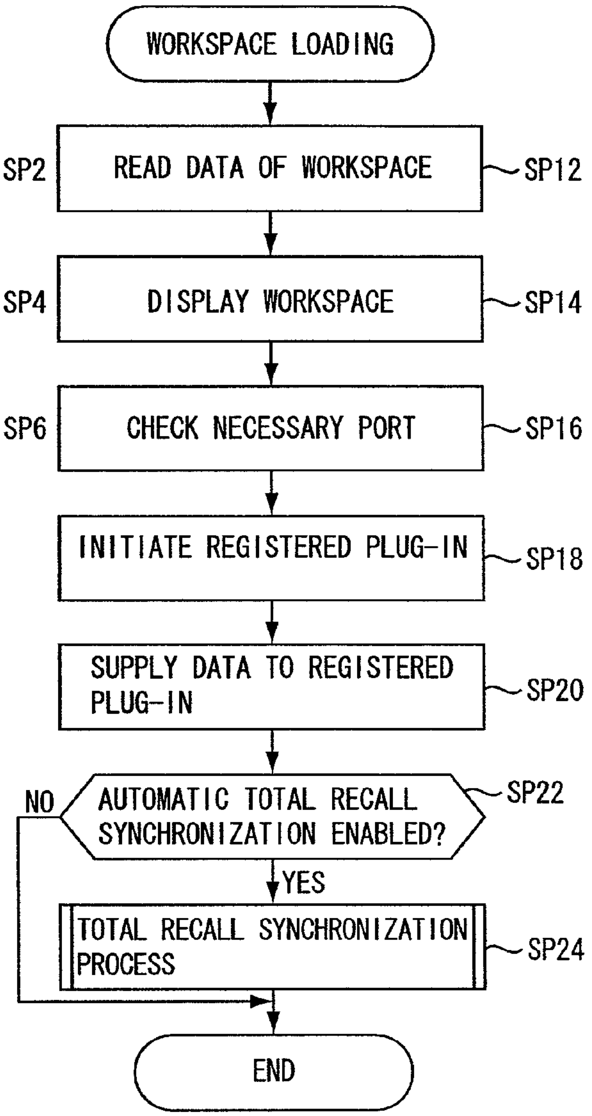
Figure 10C:
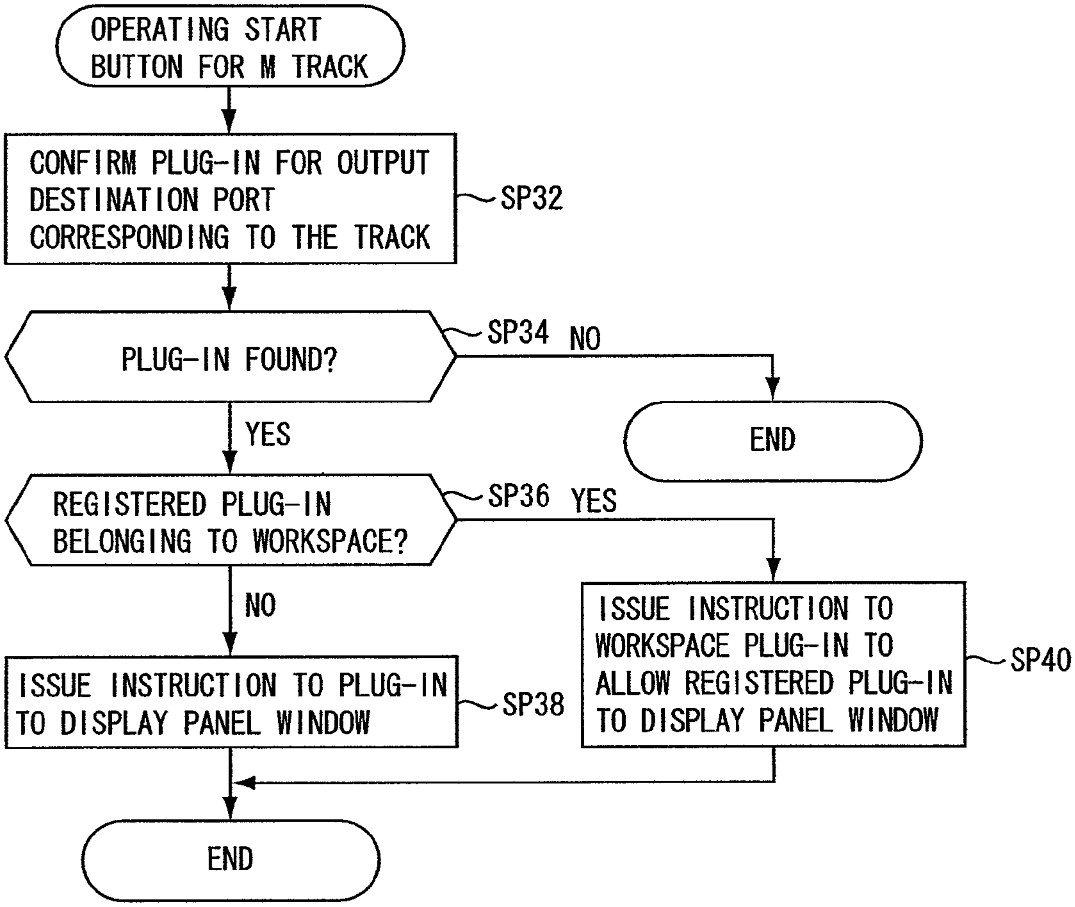

FIGS. 10(*a*), 10(*b*) and 10(*c*) are flowcharts of various routines executed by CPU.

Figure 11A:
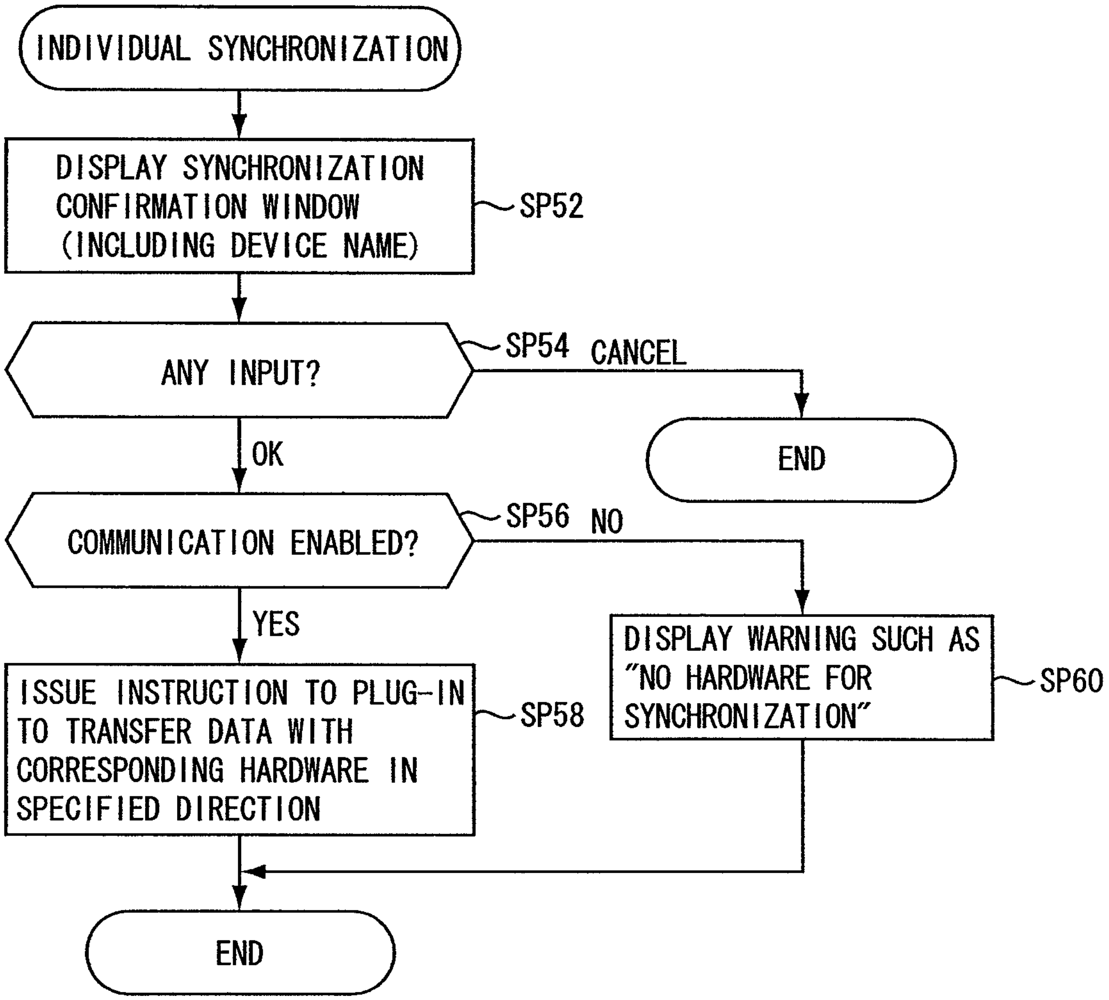
Figure 11B:
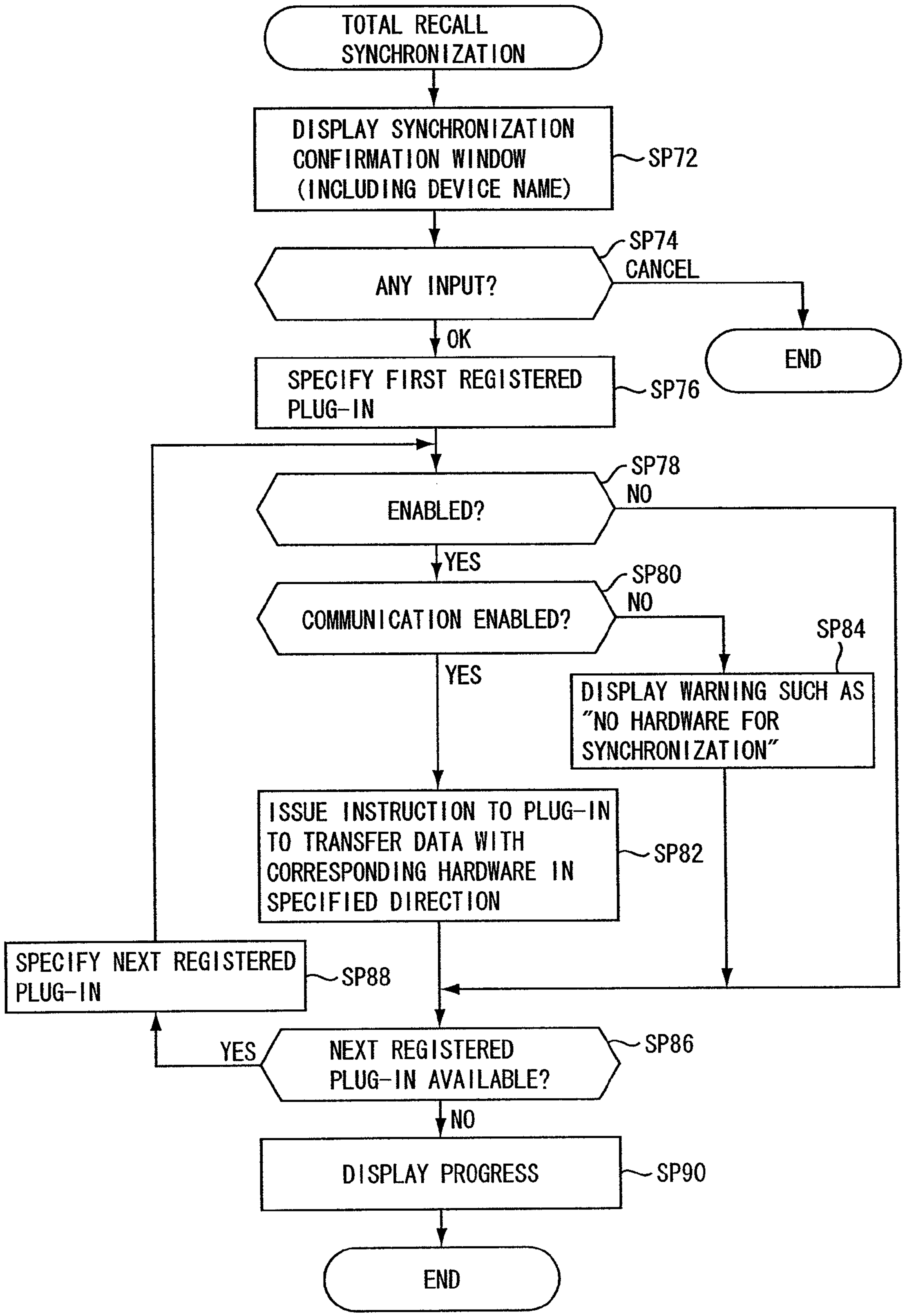

FIGS. 11(*a*) and 11(*b*) are flowcharts of various routines executed by CPU.

DETAILED DESCRIPTION OF THE INVENTION

1. Hardware Configuration of an Embodiment

1.1 Overall Configuration

Figure 1:
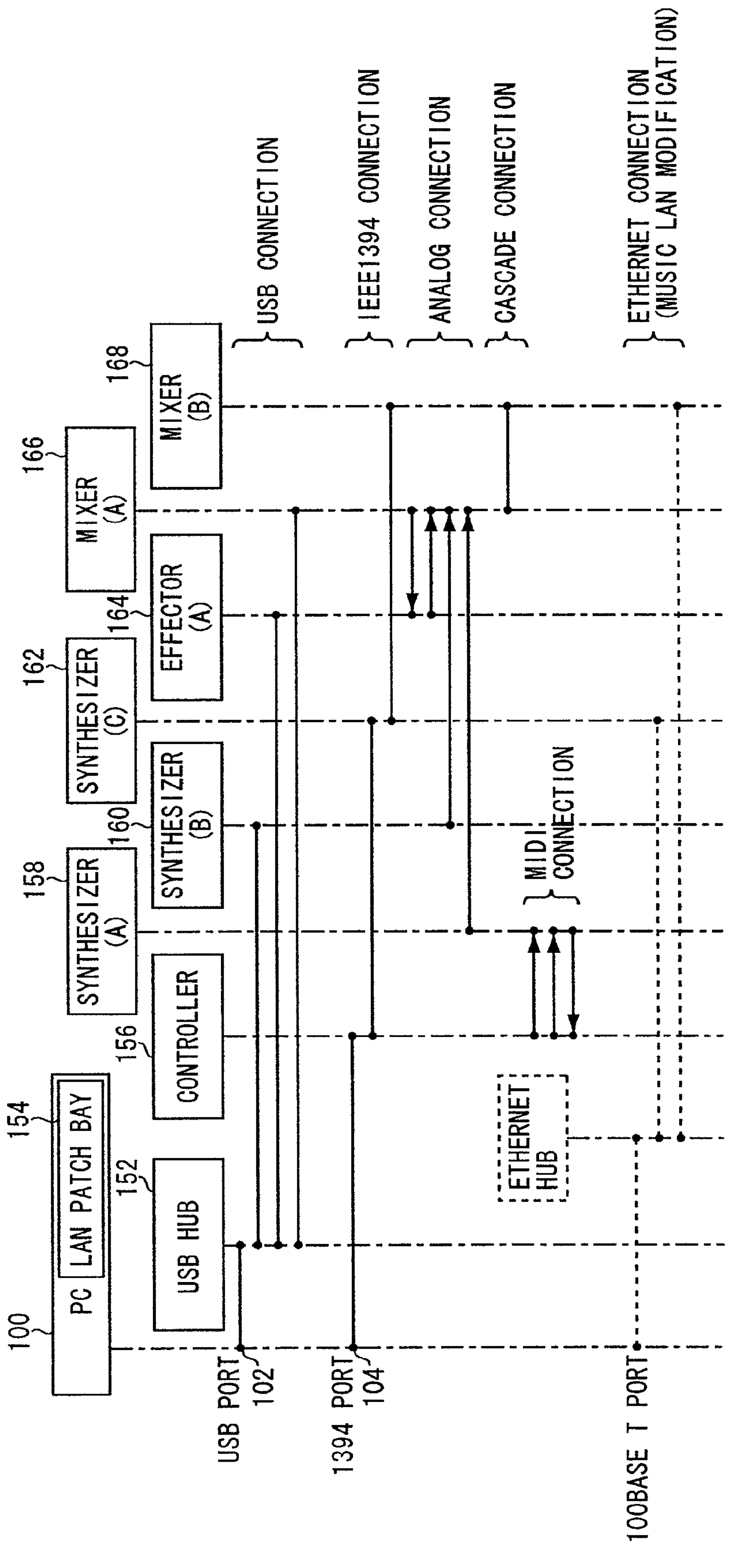
FIG. 1 is a line connection diagram of the music editing system according to an embodiment of the present invention.

The following describes the configuration of a music editing system as an embodiment of the present invention with reference to FIG. 1.

In FIG. 1, the reference numeral 100 denotes a PC/AT compatible personal computer and is provided with a USB port 102 and an IEEE1394 port 104. The IEEE1394 port 104 of the personal computer 100 is serially connected with IEEE1394 ports of a controller 156, a synthesizer 162, and a mixer 168. These devices are compliant with the musical sound signal LAN (mLAN, registered trademark) proposed by the applicants. The musical sound signal LAN uses connection lines based on the IEEE1394 standard to send and receive MIDI signals, waveform data (audio data), control signals, and the like. A LAN patch bay 154 (to be described) controls logical line connection between the devices to transmit these signals.

In this manner, musical sound signal LAN compatible devices can interchange all the necessary signals with each other via the musical sound signal LAN. If an incompatible device is included, another interface is used to connect the devices to each other. The reference numeral 152 denotes a USB hub and is connected to USB ports of a synthesizer 160, an effector 164, and a mixer 166 and intermediates communication between these devices. According to the embodiment, the USB port 102 and the EEE1394 port 104 each constitute a MIDI port comprising a plurality of channels. The personal computer 100 interchanges MIDI signals with the other devices via these MIDI ports.

The controller 156 has: a LAN interface function to interchange MIDI signals and waveform data with the other devices via the musical sound signal LAN; a mixing function to mix waveform data; and a remote control function to remotely control the music software executed on the personal computer 100. The controller 156 is provided with a display unit, many operation devices, and a signal input/output section to input and/or output MIDI signals, analog waveforms, and digital waveforms. The controller 156 can convert MIDI signals and the like received via the musical sound signal LAN into an ordinary MIDI interface (an interface to send and receive MIDI signals via a MIDI cable). In this manner, it is possible to mediate between the musical sound signal LAN and devices that are incompatible with the musical sound signal LAN or the USB connection. The synthesizer 158 is connected to the controller 156 via a MIDI cable. Accordingly, bidirectional communication is available between the personal computer 100 and the synthesizer 158 via the musical sound signal LAN.

The synthesizers 158 and 160 synthesize musical sound signals that are supplied to the mixer 166 via an analog cable. The mixer 166 outputs audio signals for some channels to the effector 164. The effector 164 applies effects to the audio signals and outputs them to the mixer 166. An analog cable is used between the mixer 166 and the effector 164 to input and output audio signals. The mixers 166 and 168 are cascade-connected via a cascade cable. The cascading connection is a connection between mixers by interchanging audio signals and control signals with each other. A plurality of mixers can operate as if they were a single mixer having many input/output channels.

1.2 Configuration of the Personal Computer 100

Figure 2:
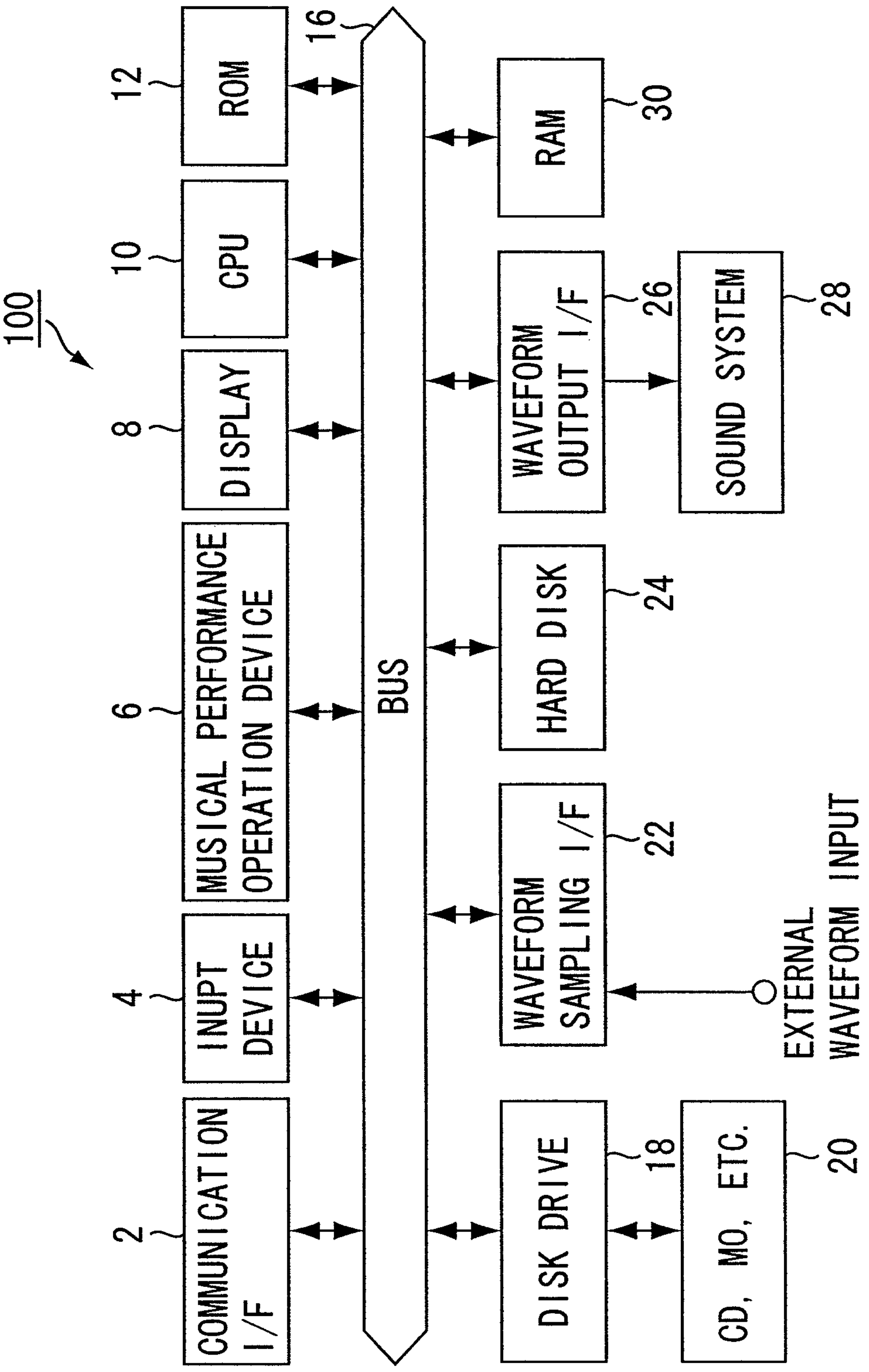
FIG. 2 is a block diagram of a personal computer used in the embodiment of the invention.

The configuration of the personal computer 100 will be described with reference to FIG. 2. The reference numeral 2 denotes a communication interface and is provided with the USB port 102 and the IEEE1394 port 104 as well as MIDI terminals (not shown). The reference numeral 4 denotes an input device comprising a keyboard for text entry, a mouse, and the like. The reference numeral 6 denotes a performance operation device comprising a keyboard for musical performance and the like. The reference numeral 8 denotes a display that displays various information for users. The reference numeral 10 denotes a CPU that controls the other components via a bus 16 based on a program to be described later. The reference numeral 12 denotes ROM that stores an initial program loader and the like.

The reference numeral 18 denotes a removable disk drive that reads or writes data on a removable disk 20 such as CD-ROM, MO, and the like. The reference numeral 22 denotes a waveform sampling interface that converts analog signals supplied from the outside into digital signals. The reference numeral 24 denotes a hard disk that stores an operating system, music software, performance information, waveform data, and the like. The reference numeral 26 denotes a waveform output interface that is supplied with digital musical sound signals via the bus 16 and converts these signals into analog signals. The reference numeral 28 denotes a sound system that generates the musical sound signals. The reference numeral 30 denotes RAM used as work memory for the CPU 10. In many cases, ordinary personal computers are not provided with the keyboard for musical performance.

2. Software Module Configuration of the Embodiment

The software module configuration of the embodiment will be described with reference to FIGS. 5(*a*) and 5(*b*).

The remote control software to control external devices is configured as a plug-in module (remote control plug-in) that is to be plugged in the other software. Conventionally, the remote control plug-in is directly plugged in software such as the music software and controls the associated external devices. In FIGS. 5(*a*) and 5(*b*), the reference numerals 402, 404, and the like denote such types of remote control plug-ins. When various plug-ins are used in the other software, program files for the plug-ins are generally stored in a specified folder of the personal computer 100. When activated, the other software to use the plug-ins checks the plug-in folder. The plug-ins detected in the plug-in folder are plugged in the other software.

In FIG. 5(*a*), the remote control plug-ins 402, 404, and the like are plugged in the software indicated as a workspace plug-in 410. The workspace plug-in 410 is further plugged in music software 420. These software are initiated for different processes. FIG. 5(*b*) shows workspace software 430 that can be initiated standalone and control remote control plug-ins even when the music software 420 is inactive.

In the following description, the workspace plug-in 410 and the standalone workspace software 430 are generically referred to as "workspace programs". These workspace programs have functions to provide similar control for each of the remote control plug-ins. However, the workspace plug-in 410 has an additional function to communicate with the music software 420 as mentioned above. There are setup states for the workspace program and the other setup states for the remote control plug-ins 402, 404, and the like plugged in the workspace program. These setup states are generically referred to as "workspaces".

In FIG. 5(*a*), the workspace plug-in 410 (management process module) intermediates communication between the music software (application process module) 420 and each of the remote control plug-ins (remote control process module) 404, 404, and the like. The music software 420 transmits an instruction for synchronization to the workspace plug-in 410. The synchronization is to make correspondence between parameter memory contents for the remote control plug-ins 402, 404, and the like and those for the corresponding external devices. At this time, the workspace plug-in 410 transmits the synchronization instruction to each of the remote control plug-ins 402, 404, and the like individually.

The music software 420 may transmit an inquiry about MIDI ports being used to the workspace plug-in 410. The workspace plug-in 410 checks MIDI ports used by the remote control plug-ins 402, 404, and the like, and returns the result to the music software 420. Further, the music software 420 may transmit an instruction to the workspace plug-in 410 to open a panel window for any of the remote control plug-ins. The panel window simulates an operation panel of the corresponding external device. The workspace plug-in 410 transmits an instruction to the corresponding remote control plug-in to display the corresponding panel window. According to this instruction, the corresponding remote control plug-in opens the panel window.

As mentioned above, the workspace program and the remote control plug-ins are initiated for different processes. The memory space allocated to a given remote control plug-in is completely independent of the memory space allocated to the workspace program. There may be a possibility where the workspace program and the remote control plug-ins are initiated for different processes and share the memory space. In this case, the software independence is impaired, increasing the possibility of causing bugs.

The following describes the interface between each of the remote control plug-ins and the corresponding external device. The remote control plug-in and the external device interchange the parameter memory contents and the other control signals with each other. For this purpose, the remote control plug-in needs to always ensure an input port for control signals and an output port for control signals. Since control signals are sent and received in the form of MIDI signals, the input/output ports correspond to the MIDI ports. It is known that the "MIDI" originally signifies an interface for sending and receiving the musical performance information. The embodiment uses the MIDI signal format to send and receive control signals.

The external device may be a synthesizer or an equivalent device that generates musical sound signals based on the musical performance information. The remote control plug-in needs to transmit the musical performance information in its original meaning to the external device so as to generate the musical sound signals. In such case, another MIDI output port is assigned for musical performance information output.

Likewise, the external device may transmit the musical performance information in its original meaning to the remote control plug-in. In such case, another MIDI input port is assigned for musical performance information input. In this manner, the remote control plug-in is assigned with at least "2" or up to "4" MIDI input/output ports for communication with the external device.

3. Operations of the Embodiment 3.1 Operations of the Standalone Workspace Software 430

When a specified operation is performed on the personal computer 100, the standalone workspace software 430 starts. The display 8 displays a workspace management window 300 in FIG. 4(*a*). In the management window 300, the reference numeral denotes a menu bar that displays a "File" button 302, a "Synchronize" button 304, and the like. The reference numeral 310 denotes a field section that displays various icons 320 through 334 as shown in FIG. 4(*a*). These icons are remote control plug-in icons registered in the workspace. Nothing is displayed in the field section 310 when no remote control plug-in is available at an initial startup of the workspace software 430, for example.

3.1.1 Details of the "File" Menu (1) Process when "Open" is Selected

When a user uses a mouse to left-click a "File" button 302, a "File" menu 352 is displayed as shown in FIG. 4(*b*). Selecting "Open" displays a window to open files. The user can select a workspace setup file. Selecting an intended workspace setup file starts a workspace load routine as shown in FIG. 10(*b*). The "workspace setup file" here means a file that stores the workspace. A "registered plug-in" means a remote control plug-in used for the workspace. A "current workspace" means a workspace currently used for the active workspace software 430.

At step SP12 in FIG. 10(*b*), the process reads the contents of the specified workspace from a hard disk 24 and the like. At step SP14, the process displays a management window 300 that displays nothing in a field section 310. The field section 310 should display icons for "started registered plug-ins". Since no registered plug-in is active at this time, the field section displays nothing. At step SP16, the process confirms the MIDI port used for a registered plug-in included in the current workspace. It may be preferable to display a warning indication such as "necessary MIDI port unavailable" concerning the registered plug-in whose MIDI port cannot be confirmed.

When the process proceeds to step SP18, the registered plug-ins becomes active to be "resident" as another process different from the workspace software 430. The field section 310 displays the icons 320 through 334 for external devices associated with the activated registered plug-ins. Each registered plug-in has its specific memory space. When the workspace software 430 needs to reference the content of the parameter memory included in the initiated remote control plug-in, the workspace software 430 issues an instruction to the remote control plug-in to inquire about the content. In response to this, the remote control plug-in returns the content to the workspace software 430. It may be preferable to use the workspace setup file to include the information whether or not to activate the panel window for the registered plug-ins and automatically activate the registered plug-in's panel window defined to be "activated" at this time. At step SP20, the process supplies the setup state of each registered plug-in included in the current workspace as a parameter to be specified for each activated registered plug-in. In each registered plug-in, the supplied parameter is written to the parameter memory of the registered plug-in.

At step SP22, the process determines whether or not "automatic total recall synchronization" is turned on in the current workspace. The "total recall synchronization" automatically synchronizes the content of the parameter memory in each external device with the content specified for the current workspace. If the determination result is "NO", the routine process terminates immediately. If the determination result is "YES", the process proceeds to step SP24. At this step, a total recall synchronization process routine in FIG. 11(*b*) is called. The registered plug-in targeted to the total recall synchronization starts a process to transmit parameters to the corresponding external device. It is possible to configure each registered plug-in to be targeted to the total recall synchronization. The configuration method will be described later in detail. In addition, the detail about the total recall synchronization process routine will be described later.

(2) Process when "Setup" is Selected

Selecting "Setup" in the "File" menu 352 displays a workspace setup window 600 on the display 8. In FIG. 7, the reference numeral 610 denotes a registrable plug-in display section that lists names of all remote control plug-ins installed in the personal computer. The personal computer's plug-in folder contains corresponding program files. The reference numeral 620 denotes a registered plug-in display section that lists names of registered plug-ins in the current workspace. Using the mouse, a user can click to select one or more plug-ins displayed in the display sections 610 and 620.

The reference numeral 612 denotes an Add button. Using the mouse, clicking the Add button 612 adds a plug-in selected in the registrable plug-in display section 610 to the registered plug-in display section 620. When a plug-in is already displayed in the registered plug-in display section 620, selecting that plug-in and operating the Add button 612 also adds the plug-in to the registered plug-in display section 620. At this time, the plug-in name is partially modified to be distinguished from the already registered plug-ins. When "mixer (A)" is already registered, for example, further adding "mixer (A)" renames it to "mixer (A)-2". It may be preferable to allow users to specify any names. The reference numeral 614 denotes a Del button. Using the mouse, clicking the Del button deletes a plug-in selected in the registered plug-in display section 620. These operations can be used to edit the registered plug-ins in the current workspace as needed.

The reference numerals 616 and 618 denote priority specification sections to specify registered plug-ins targeted to the total recall synchronization. According to the configuration in FIG. 1, the LAN patch bay 154 is line connection control software that establishes logical transmission lines for MIDI signals and waveform data between devices including the personal computer 100 connected to the musical sound signal LAN. The LAN patch bay 154 is executed on the personal computer 100. Control from the LAN patch bay 154 controls musical sound signal LAN interfaces for the devices and establishes logical transmission lines on the musical sound signal LAN. The LAN patch bay 154 has a function to create MIDI signal and waveform data ports for the other devices and needs to be configured prior to these devices. Accordingly, the LAN patch bay 154 is assigned the highest priority (1). The controller is assigned the next highest priority (2) because it has a function to remotely control the music software executed on the personal computer. The other devices are not assigned priorities. Priority (3) will be assigned next. The total recall synchronization may be executed with priorities assigned to at least some of the registered plug-ins. In this case, the workspace program issues a synchronization instruction individually to the prioritized registered plug-ins according to the priorities. When completing the synchronization of a registered plug-in specified for the synchronization, the workspace program issues the synchronization instruction to another plug-in having the next priority. When completing all the prioritized registered plug-ins, the workspace program issues the synchronization instruction to the other registered plug-ins at a time.

The reference numeral 622 denotes a total recall synchronization check box. Using the mouse, clicking to check or uncheck this check box turns on or off the "automatic total recall synchronization" state (see step SP22 of the workspace load routine (FIG. 10(*b*)). The reference numeral 624 denotes a Set Default button. Using the mouse, clicking this button registers a state of the current workspace to register the remote control plug-ins as a default workspace. The default workspace is used by default when the workspace program starts, for example. With the default workspace specified, the field section 310 displays icons based on the default workspace when the workspace program starts without reading the workspace setup file or when the initiated workspace program creates a new workspace.

The reference numeral 626 denotes a MIDI input port list box that lists MIDI ports currently available in the workspace (those not used for the other software). These MIDI ports can be selected from the MIDI input ports implemented by the USB port 102 or the IEEE1394 port 104 and the MIDI input port corresponding to the above-mentioned MIDI terminal. The reference numeral 628 denotes a MIDI output port list box that lists MIDI output ports implemented by the USB port 102 or the IEEE1394 port 104. These list boxes 626 and 628 can allow one or more MIDI input/output ports to be selected and the selected MIDI input/output ports to be able to be allocated to the registered plug-ins.

The reference numeral 630 denotes an OK button. Using the mouse, clicking the OK button 630 updates the contents of the workspace as defined in the workspace setup window 600 and closes this window. The reference numeral 632 denotes a Cancel button. Using the mouse, clicking the Cancel button 632 discards the edited contents and then closes the workspace setup window 600.

(3) Process when "Save" is Selected

Selecting "Save" from the "File" menu 352 starts a workspace save routine as shown in FIG. 10(*a*). At step SP2 in FIG. 10(*a*), the process collects parameter memory contents from the registered plug-ins. When the registered plug-in is "online" as mentioned above, the parameter memory is updated based on ever-changing states of the external device. Accordingly, the parameter memory content collected by at step SP2 corresponds to the current state of each external device. Specifically, at step SP2, the workspace program sends an inquiry to each registered plug-in about parameter memory contents stored in the memory area. In return, the workspace program receives the parameter memory contents from each of the registered plug-ins.

At step SP4, the process combines the collected data with the workspace program's parameter to generate data (workspace setup data) to be written to the setup file. The "workspace program's parameter" is a parameter that is specified in the workspace setup window. At step SP6, the generated data is overwritten to the setup file corresponding to the current workspace.

(4) Other Processes

Selecting "Save As" from the "File" menu allows the display 8 to display a window to enter a filename of a new setup file for recording the current workspace. When the user specifies a filename, the file corresponding to the specified filename is subject to a process similar to that when "Save" was selected. Selecting "Close" from the "File" menu 352 closes the current workspace to assign the content of the default workspace to the current workspace. Selecting "Quit" from the "File" menu 352 closes the workspace management window 300 to terminate the workspace software 430. The user may select "Close" or "Quit" when the current workspace content is not recorded in the setup file. In this case, the user is given a warning notifying the situation. The process takes place as needed similarly when "Save" or "Save As" is selected.

3.1.2 Left-Double-Clicking on Icons

Using the mouse, the user can move the cursor to any one of the icons 320 through 334, and then double-click the left mouse button (left-double-clicking). This operation outputs an instruction to display the panel window (e.g., a remote control plug-in panel window 500 in FIG. 6) for the remote control plug-in associated with the icon. As a result, the corresponding remote control plug-in displays the panel window. The panel window can be used to control parameters and the like for the corresponding external device. Processes for the panel window 500 will be describe later in more detail.

3.1.3 Detail of the "Synchronize" Menu

Using the mouse, the user moves the cursor to the "Synchronize" button and then clicks the left mouse button (left-clicking) to display a "Synchronize" menu 354. At this time, selecting "Total Recall" starts a total recall synchronization routine in FIG. 11(*b*). At step SP72 in FIG. 11(*b*), the display 8 displays a total recall synchronization confirmation window 720 in FIG. 9(*b*). In FIG. 9(*b*), the reference numerals 722 and 724 denote radio buttons. Using the mouse, the user can either of these radio buttons as a total recall synchronization direction, i.e., "To Hardware" (from the registered plug-in to the external device) or "From Hardware" (from the external device to the registered plug-in).

The reference numeral 726 denotes a plug-in display section. The plug-in display section 726 enumerates names of one or more registered plug-ins for which the total recall synchronization is permitted, i.e., registered plug-in names targeted for the total recall synchronization. Since the targeted plug-in names are displayed here, the user can determine at a glance whether or not the total recall synchronization is performed for the intended external device. The reference numeral 728 denotes an OK button to start execution of the total recall synchronization. The reference numeral 730 denotes a Cancel button to stop execution of the total recall synchronization.

Returning now to FIG. 11(*b*), at step SP74, the process waits until the user uses the mouse to click the OK button 728 or the Cancel button 730. Clicking the Cancel button 730 stops the total recall synchronization and immediately terminates the routine. Clicking the OK button 728 advances the process to step SP76. The process selects the first plug-in to be processed from the registered plug-ins listed in the workspace. At step SP78, the process determines whether or not the total recall synchronization is permitted for the plug-in.

If the result is "NO", the process proceeds to step SP86 to search for the next registered plug-in in the list and determine whether or not the relevant plug-in is found. If the result is "YES", the process proceeds to step SP88. The process specifies the retrieved plug-in to be the next process target and returns to step SP78.

If the result is "YES" at step SP78, the process proceeds to step SP80 to determine whether or not the personal computer 100 can communicate with an external device associated with the registered plug-in. Specifically, a test signal is transmitted via the MIDI output port specified by the registered plug-in. If a response signal returns via the MIDI input port within a specified time, it is assumed to be "communicable". If no response signal returns within the specified time, the result is assumed to be "NO" at step SP80. The process proceeds to step SP84.

At this time, the display 8 displays a warning window showing a message "No hardware for synchronization" and the registered plug-in name for processing. The user can close this warning window. According to the routine, however, the process proceeds to step SP86 when the warning window is displayed.

If the result is "YES" (communicable) at step SP80, the process proceeds to step SP82. The process then outputs an instruction to the registered plug-in for processing to perform the synchronization with the corresponding external device. The instruction includes the total recall synchronization direction ("To Hardware" or "From Hardware") specified by the radio button 722 or 724. The registered plug-in starts the data transfer in the specified total recall synchronization direction.

After a loop of steps SP78 through SP86 is repeated for all the registered plug-ins, the result is assumed to be "NO" at step SP86 and the process proceeds to step SP90. At this time, the display 8 displays a total recall synchronization progress display window 740 in FIG. 9(*c*). Inside the window 740, the reference numerals 741, 743, 745, and 747 denote plug-in name display sections to display registered plug-in names targeted for the total recall synchronization. The illustrated example shows that only "4" registered plug-ins are specified for the total recall synchronization.

When the registered plug-in is targeted for the total recall synchronization, the registered plug-in allows the progress of the synchronization to be kept track of. That is to say, the registered plug-in calculates a ratio of the synchronized data amount to the entire data amount targeted for the synchronization. Calculation results are sequentially reported to the workspace software 430. The reference numerals 742, 744, 745, and 748 denote histograms that display the ever-changing progress of the synchronization reported from the plug-ins. The reference numerals 752, 754, 756, and 758 denote Cancel buttons provided to the plug-ins targeted for the total recall synchronization. Mouse-clicking the Cancel button outputs an instruction to the corresponding registered plug-in to stop the synchronization. When identifying the instruction, the registered plug-in stops the synchronization.

When a given registered plug-in completes the total recall synchronization in progress, the workspace software 430 is notified of this. The corresponding registered plug-in changes to be "online". The "online" state signifies realtime synchronization between the registered plug-in and the corresponding external device. That is to say, an operation on the personal computer 100 or the external device modifies the parameter memory in the registered plug-in or the external device. The modified content is transmitted to the other to keep both the parameter memory contents corresponding to each other. No registered plug-in can change to be "online" until the synchronization is complete. The routine process terminates when the synchronization is completed for all the registered plug-ins.

3.1.4 Details of the Right-Click Menu on Icons

When the field section 310 displays icons, right-mouse clicking on any of the icons displays an icon menu 360 in FIG. 4(*d*). Selecting "Open" displays the panel window (e.g., FIG. 6) for the remote control plug-in associated with the corresponding icon as described in "Left-double-clicking on icons" above. Selecting "Close" from the icon menu 360 closes the panel window.

Each time "TRecall Enable" is selected, the total recall synchronization toggles between the enabled state (a check mark displayed) and the disabled state (no check mark displayed). The state selected here determines the result at step SP78 as mentioned above. Selecting "TRecall Data" displays a synchronization item selection window 362. The window lists parameter group names stored in the parameter memory of the corresponding registered plug-in. The user can select groups to be synchronized.

Selecting "Remove" removes the icon from the field section 310. The corresponding remote control plug-in is excluded from the registered plug-ins. Selecting "Synchronize" starts an individual synchronization routine as shown in FIG. 11(*a*). At step SP52 in FIG. 11(*a*), the display 8 displays an individual plug-in synchronization confirmation window 700. In FIG. 9(*a*), the reference numerals 702 and 704 denote radio buttons corresponding to "To Hardware" and "From Hardware" as synchronization directions one of which can be selected. The reference numeral 706 denotes a plug-in name display section that displays one registered plug-in to be synchronized. The reference numeral 708 denotes an OK button to start execution of the synchronization. The reference numeral 710 denotes a Cancel button to stop execution of the synchronization.

Returning now to FIG. 11(*b*), at step SP54, the process waits until the user uses the mouse to click the OK button 708 or the Cancel button 710. Clicking the Cancel button 710 stops the synchronization and immediately terminates the routine. Clicking the OK button 708 advances the process to step SP56. Like the process at step SP80, it is determined whether or not the personal computer 100 can communicate with an external device associated with the registered plug-in.

If the communication is impossible, the process proceeds to step SP60. The display 8 displays a warning window similar to that displayed at step SP84 above. If the result is "YES" (communicable) at step SP56, the process proceeds to step SP58. Like step SP82 above, the process outputs an instruction to the registered plug-in to perform the synchronization with the corresponding external device. The instruction includes the synchronization direction specified by the radio button 702 or 704. In this manner, the routine process terminates. When the synchronization is complete for the registered plug-in thereafter, the registered plug-in changes to be "online".

3.2 Operations of the Remote Control Plug-in Panel Window 500 (FIG. 6)

As mentioned above, left-double-clicking on any of the icons 320 through 334 displays the panel window of the remote control software for the corresponding device. Operations of the panel window will be described in detail according to an example of displaying the remote control plug-in panel window 500 (FIG. 6) for the controller 156 corresponding to the icon 320. In FIG. 6, the reference numeral 510 denotes a menu bar that displays a "File" button 512, a "Synchronize" button 516, and the like. The reference numeral 520 denotes a field section that displays images for level meters 522 and 524, a channel name display section 526, a rotary control 528, switches 530 and 532, and faders 534 and 536 as shown in FIG. 6.

The images displayed in the field 520 simulate the configuration of an operation panel on the controller 156 as the corresponding external device or an equivalent configuration of functions implemented by the operation panel. When the registered plug-in is "online", the controller 156 notifies the personal computer 100 of the contents to be displayed on the level meters 522 and 524, and the like. Based on the received operation contents, the registered plug-in updates the contents of its parameter memory. When the switches, rotary controls, faders, and the like are operated on the operation panel of the controller 156, the operation contents are notified to the personal computer 100.

By contrast, using the mouse, the user can click or drag to operate the rotary control 528, the switches 530 and 532, the faders 534 and 536, and the like in the field section 520. The operation contents are notified to the controller 156. Based on the received operation contents, the controller 156 updates the contents of its parameter memory. In this manner, the personal computer 100 or the controller 156 notifies the other of the operation contents that are immediately reflected in the parameter memory of the notified side. The registered plug-in and the controller 156 always maintain the same contents in their parameter memories. Accordingly, the display contents of the field section 520 match the states of the operation panel on the controller 156.

3.2.1 Process when "Setup" is Selected from the "File" Menu

In the menu bar 510, left mouse clicking on the "File" button 512 displays a "File" menu similar to the "File" menu 352 (FIG. 4(*b*)) in the workspace management window 300 as mentioned above. Selecting "Setup" from the "File" menu allows the display 8 to display a remote control plug-in setup window 650 as shown in FIG. 8. The reference numerals 652 and 656 denote combo boxes for selecting MIDI input ports to input various control signals and the musical performance information. These combo boxes allow selection of MIDI input ports for control signals and the musical performance information from a plurality of candidates.

Likewise, the reference numerals 654 and 658 denote combo boxes for selecting MIDI output ports to output various control signals and the musical performance information. These combo boxes allow selection of MIDI output ports for control signals and the musical performance information from a plurality of candidates. The workspace program notifies the remote control plug-ins of MIDI input/output port candidates to be displayed in the combo boxes 652 through 658.

As mentioned above, the workspace program allows a plurality of MIDI input/output ports to be selected from a MIDI input port list box 626 and a MIDI output port list box 628 (FIG. 7). The selected MIDI input/output ports include those already allocated to the other remote control plug-ins. The remaining MIDI input/output ports except the allocated ones are notified to the remote control plug-ins. In this manner, the combo boxes 652 through 658 allow selection of the MIDI input/output ports so as to avoid duplicates with the MIDI input/output ports for the other registered plug-ins.

The reference numeral 660 denotes an OK button. Mouse-clicking on the OK button 660 updates the MIDI input/output ports assigned to the remote control plug-in as specified in the setup window 650, and then closes the setup window 650. The reference numeral 662 denotes a Cancel button. Mouse-clicking on the Cancel button 662 discards the edit contents, and then closes the setup window 650. The edit contents, i.e., the MIDI input/output ports assigned to the remote control plug-in, are written to the remote control plug-in's parameter memory. The workspace program issues an inquiry to each remote control plug-in to obtain the information about MIDI input/output ports assigned to the remote control plug-in. The workspace program may be the workspace plug-in 410. In such case, the workspace plug-in 410 responds to a request from the music software 420 and notifies it of correspondence between each remote control plug-in and the MIDI input/output ports.

3.2.2 Other Processes

Selecting "Open" from the "File" menu displays a window to open files. The user can select the setup file for the registered plug-in. The setup file for plug-in has a format specific to the registered plug-in. This format differs from that for the above-mentioned setup file for workspace. The setup file for plug-in stores parameters only associated with the corresponding plug-in. When the setup file is selected, parameters defined in the setup file are overwritten to the parameter memory of the registered plug-in.

Like the operations on the workspace management window 300 as mentioned above, selecting "Save" or "Save As" from the "File" menu stores the contents of the plug-in's parameter memory in the setup file for plug-in. Selecting "Quit" from the "File" menu closes the panel window 500. The corresponding registered plug-in itself is "resident" and continues to be active. When the registered plug-in is "online", the parameter memory content is always maintained to correspond to the external device's state. When the panel window 500 is reopened thereafter, the field section 520 and the like reflect the current state.

There has been described the configuration and operations of the remote control plug-in panel window 500 for the controller 156. The remote control plug-in panel window for the other external devices provides the same configuration and operations for the menu bar 510 as those for the above-mentioned panel window 500. It is to be distinctly understood that the contents of the field section 520 depend on the configuration of the operation panel for each external device.

3.3 Operations of the Music Software

Performing specified operations on the personal computer 100 initiates the music software 420 capable of recording, playing, and editing sequence data comprising waveform data, MIDI data, and the like on a plurality of tracks independently. The display 8 displays a music software window 200 as shown in FIG. 3(*a*). In FIG. 3(*a*), the reference numeral 210 denotes a menu bar that displays various menu buttons such as a "File" button 211, a "Plugins" button 214, and the like. The reference numeral 220 denotes a track display section comprising a plurality of "rows" divided into tracks of sequence data played back by the music software 420. The reference numeral 222 denotes a start button section comprising start buttons provided for the corresponding tracks. The start button is a kind of graphic control used to open the panel window of the external device (MIDI sound module, mixer, effector, and the like) or the software (software synthesizer, software effector, and the like) to be supplied with MIDI signals or waveform data played on each track.

The music software 402 plays back sequence data that can include the musical performance information (MIDI data) and waveform data for each of the tracks. The reference numeral 224 denotes a track type display section to display whether data for each track is waveform data (W) or MIDI data (M). The reference numeral 228 denotes a track name display section that displays a name (e.g., timbre name) assigned to each track. The reference numeral 230 denotes an output port display section that displays an output port name assigned to each track. The output ports are resources of the system, and allocatable to external devices corresponding to the tracks. The reference numeral 240 denotes a block display section that displays a block for each track. The block indicates a range of sequence data comprising a MIDI signal or waveform data along the abscissa as a time axis. The reference numeral 250 denotes a recording/playback operation section comprising: buttons 254 through 262 to record, play, fast-forward, rewind, and stop sequence data; and a time code display section 252 to display a time code. To start recording, the user specifies one or more tracks ((M) and/or (W)) to be recorded. The user moves a time axis cursor to a position to start recording, operates the recording button 262 to wait for recording, and then operates the start button 260 to start recording the specified track. To start playback, the user moves the time axis cursor to a position to start playback, and then operates the start button 260 to play back all the unmuted tracks. Operating the stop button 258 can stop the recording or the playback in process.

When the workspace plug-in 410 is configured to be resident (active), initiating the music software 420 initiates the workspace plug-in 40 in the "resident" state. Further, the registered plug-ins plugged in the workspace plug-in 410 are also initiated in the "resident" state. According to the embodiment, the music software 420 initiates the plugged-in workspace plug-in 410. The workspace setup window 600 is used to register any remote control plug-in. At this time, the workspace plug-in 410 is automatically made resident (active). That is to say, it is assumed that the workspace plug-in 410 has registered plug-ins. It may be preferable that the user can select whether the music software 420 should "use" or "not use" the workspace plug-in 410. In this case, the workspace plug-in 410 can be made resident when selected to be "used". It is desirable that the selection is saved in a sequence data file to be described later. Alternatively, after the music software 420 initiates the workspace plug-in 410, it may be preferable to allow the workspace plug-in to become "resident".

3.3.1 Operations After Selecting the "Plugins" Button 214

Mouse-clicking the "Plugins" button 214 displays a plug-in menu 270 in FIG. 3(*b*). This menu lists names of various plug-in software (plug-ins corresponding to program files placed in the plug-in folder) plugged in the music software 420. The plug-in menu 270 also lists the plug-in software such as "XG editor" and "DX editor" for the above-mentioned remote control plug-in. "WS manager" is the name of the above-mentioned workspace plug-in 410.

The music software 420 is loaded with all the plug-in software corresponding to the program files in the plug-in folder. The plug-in menu 270 lists names of these plug-in software. The plug-in software are directly plugged in the music software 420 without mediation of the workspace plug-in 410. Some of the plug-in software are registered to the workspace plug-in 410 and the others are not.

When "WS manager" is selected from the plug-in menu 270, the selection is notified to the workspace plug-in 410. The workspace plug-in 410 displays the workspace management window 300 on the display 8. Operations in the management window 300 are the same as those for the above-mentioned standalone workspace software 430. That is to say, various operations are available such as left-double-clicking on an icon displayed in the field section 310, starting the panel window for the registered plug-in corresponding to the icon, and the like.

When the music software 420 initiates the workspace plug-in 410, the workspace plug-in 410 may issue a request. In response to the request, the music software 420 notifies the workspace plug-in 410 of available MIDI input/output ports. This is because the personal computer 100 provides available MIDI input/output ports some of which may be used independently of the workspace plug-in 410. For example, there may be available input/output ports used for the software directly plugged in the music software 420. Accordingly, when the workspace plug-in 410 displays the setup window 600, the MIDI input port list box 626 and the MIDI output port list box 628 list only the MIDI input/output ports notified from the music software 420. The MIDI input/output ports are resources of the system allocatable to the external devices.

When the user selects a remote control plug-in directly plugged in the music software from the plug-in menu 270, the music software initiates the corresponding plug-in. The display 8 displays the panel window, allowing the user to modify various settings.

3.3.2 Start Button Operations and Effects

When a start button belongs to the MIDI data (M) track in the start button section 222, mouse-clicking the start button initiates a start button operation event routine as shown in FIG. 10(*c*). The track plays back musical performance information that is output to a MIDI output port. Based on this MIDI output port, at step SP32 in FIG. 10(*c*), the process detects the external device (MIDI sound module) or the software (software synthesizer) that uses the output port as an input source for the musical performance information. When the remote control plug-in to be used is directly plugged in the music software 420, the music software 420 issues an inquiry to the remote control plug-in and can determine which MIDI output port is used to supply the musical performance information to the external device corresponding to the remote control plug-in. When the music software 420 uses the workspace plug-in 410, the music software 420 issues an inquiry to the workspace plug-in 410 and can determine which MIDI output port is used to supply the musical performance information to the external device corresponding to each registered plug-in in the workspace. As mentioned above, the workspace plug-in 410 can obtain the correspondence between each registered plug-in and the MIDI input/output port for musical performance information from the registered plug-ins. The workspace plug-in 410 notifies the music software 420 of the obtained correspondence information. When the software synthesizer is used as the music software, each software synthesizer provides its special virtual MIDI port at startup. Therefore, the correspondence can be immediately determined according to the output port. When the external device is detected, the process determines the remote control plug-in that controls the external device. When the software is detected, the process determines the corresponding software control plug-in.

A MIDI signal output from the MIDI output port may be supplied to MIDI devices that are not compliant with remote control. Obviously, in such case, there is no corresponding plug-in. At step SP34, the process determines whether or not any remote control plug-in or software control plug-in is retrieved based on the detection result at step SP32. If the result is "NO", the routine process terminates immediately.

If the result is "YES" at step SP34, the process proceeds to step SP36. It is determined whether or not the detected plug-in is a registered plug-in belonging to the workspace plug-in 410. If the result is "YES", the process proceeds to step SP40. The music software 420 issues an instruction to the workspace plug-in 410 to output an instruction to the registered plug-in so as to display the panel window. Based on this process, the workspace plug-in 410 outputs an instruction to the registered plug-in so as to display the panel window. The registered plug-in displays the panel window on the display 8.

When the detected plug-in is directly plugged in the music software 420, the result at step SP36 is "NO". The process proceeds to step SP38. The music software 420 outputs an instruction to the plug-in to display the panel window. The plug-in displays the panel window on the display 8.

3.3.3 Details of the "File" Menu (1) Process when "Open" is Selected

Left-mouse-clicking on the "File" button 211 displays the "File" menu similar to that shown in FIG. 4(*b*) above. Selecting "Open" displays the window to open files. The user can select sequence data files for musical performance information and the like. When a given sequence data file is selected, its content is read, enabling processes such as playback of the musical performance information on the recording/playback operation section 250.

According to the embodiment, the sequence data file can contain "workspace setup data". The content of workspace setup data is similar to the above-mentioned "workspace setup file". When the sequence data file is configured to allow the workspace plug-in to be active (resident), the sequence data file contains the workspace setup data. When the workspace setup data is contained, the workspace plug-in 410 is initiated. The music software 426 supplies the workspace plug-in 410 with the workspace setup data. When supplied with the workspace setup data, the workspace plug-in 410 performs the process similar to the above-mentioned workspace load routine (FIG. 10(*b*)).

That is to say, the supplied workspace setup data is read. The display 8 displays the management window 300 with the field section 310 nothing displayed in it. The process then confirms the MIDI ports used for the remote control plug-ins contained in the workspace (SP16). The process initiates the registered plug-ins as being "resident" and displays the corresponding icons in the field section 310 (SP18). The process writes a parameter corresponding to the current workspace in the parameter memory of each registered plug-in (SP20). When the "automatic total recall synchronization" is enabled, the process starts a parameter transmission process for the corresponding external device (SP24).

(2) Process when "Save" is Selected

Let us consider that the music software 420 is configured to allow the workspace plug-in 410 to be active (resident). When "Save" is selected from the "File" menu corresponding to the "File" button 211, the music software 420 outputs an instruction to the workspace plug-in 410 to collect the workspace state. As a result, the workspace plug-in 410 performs a process similar to the above-mentioned workspace save routine (FIG. 10(*a*)). Issuing requests to the registered plug-ins to collect the parameter memory contents from the registered plug-ins (SP2). The collected data is combined to the parameter of the workspace program itself to create the "workspace setup data" (SP4).

According to the example, the workspace setup data is generated based on the instruction from the music software 420. In such case, the workspace setup data can be supplied to the instruction-issuing software instead of performing the process at step SP6 (writing data in the setup file). When supplied with the workspace setup data from the workspace plug-in 410, the music software 420 combines the workspace setup data with the sequence data at the time. Data as the combination result is stored as a sequence data file in the hard disk 24. The workspace plug-in 410 may be initiated from the music software 420. Even in such case, the setup file for the workspace plug-in 410 is capable of writing and reading independently of the sequence data file for the music software 420. Accordingly, it is possible to move the setting of the workspace plug-in 410 corresponding to a given sequence data file for the music software 420 to another sequence data file.

4. Modifications

The present invention is not limited to the above-mentioned embodiment but may be embodied in various modifications as follows.

(1) The embodiment performs various processes using the workspace program, the application program, the remote control plug-in, and the like operating on the personal computer. It is also possible to distribute these programs by means of not only storing them on recording media such as CD-ROM and flexible disks, but also transmitting them via communication line.

(2) The embodiment performs the start button operation event routine (FIG. 10(*c*)) only in response to mouse-click on any start button belonging to the MIDI data (M) track in the start button section 222. The similar process may be performed in response to mouse-click on a start button belonging to the waveform data (W) track.

(3) Different icons may be used for the external devices associated with the registered plug-ins displayed in the field section 310 of the workspace. Icons may be designed as not only shapes representing the external devices associated with the registered plug-ins, but also logos, images, and the like. The "icons" are not limited to bit-mapped graphics but may be simple boxes that contain product model numbers, trademarks, user-supplied names, and the like.

(4) According to the embodiment, the workspace software 430 determines whether or not there is an external device to be synchronized during the total recall synchronization or the individual synchronization (SP80 or SP56). The workspace software 430 may periodically check the availability of external devices and not check it during the synchronization process. The workspace software 430 itself does not always need to check the availability. The workspace software 430 may issue an instruction to each registered plug-in and allow the registered plug-in to check the availability of external devices under control.

(5) The LAN dedicated to musical sound signals can be implemented on networks other than the IEEE1394 standard. The musical sound signal LAN may be constructed on 100 baseT Ethernet (registered trademark) according to a line connection as indicated by dotted lines in FIG. 1. Alternatively, a wireless LAN or a USB may be used to implement a similar musical sound signal LAN.

What is claimed is:

1. A remote control system comprising:

a computer having an operating system, a first program, and a plurality of remote control plug-ins for plugging into the first program for controlling a plurality of external devices when connected to the computer, the external devices being sound signal handling devices, the computer being configured to:

selectively initiate one or more remote control plug-ins among one or more available remote control plug-ins of the plurality of remote control plug-ins;

edit content of an operating parameter in response to an editing operation, the operating parameter being used by an initiated remote control plug-in for controlling one of the plurality of external devices;

collect content of the operating parameter from each of the initiated one or more remote control plug-Ins when a save instruction is detected; and combine a first program parameter representing a state of the first program with the collected content of the operating from each of the initiated one or more remote control plug-ins to thereby produce a setup file, and save the setup file on a recording medium, wherein, among the initiated one or more remote control plug-ins, a first initiated remote control plug-in corresponding to a first external device in an online state, among the plurality of external devices, is configured to control the corresponding first external device based on the operating parameter.

2. The remote control system according to claim 1, wherein the computer is further configured to perform a synchronization process to synchronize the operating parameter of the first initiated remote control plug-in and the operating parameter on the corresponding first external device, and wherein the first initiated remote control plug-in that completes the synchronization process is in the online state with the corresponding first external device of a control target, and the first initiated remote control plug-in in the online state notifies the corresponding first external device in real time, of content of the operating parameter edited according to the editing operation.

3. The remote control system according to claim 1, wherein the computer is further configured to display icons each corresponding to each of the initiated one or more remote control plug-ins, and wherein, when an operation is applied to a first icon of the displayed icons, the initiated remote control plug-in corresponding to the first icon applied displays a control screen for use in controlling a corresponding external device of the plurality of external devices, and wherein, when the editing operation is performed on the control screen, content of the operating parameter of the initiated remote control plug-in corresponding to the first icon is edited according to the editing operation performed on the control screen.

4. A remote control method of controlling a plurality of external devices, when connected to a computer, through a plurality of remote control plug-ins, the remote control method comprising:

selectively initiating one or more remote control plug-ins among one or more available remote control plug-ins of the plurality of remote control plug-ins;

editing content of an operating parameter in response to an editing operation, the operating parameter being used by an initiated remote control plug-in for controlling one of the plurality of external devices;

collecting content of the operating parameter from each of the initiated one or more remote control plug-ins when a save instruction is detected; and combining a first program parameter representing a state of the first program with the collected content of the operating parameter from each of the initiated one or more remote control plug-ins to thereby produce a setup file, and saving the setup file on a recording medium, wherein, among the initiated one or more remote control plug-ins, a first initiated remote control plug-in corresponding to a first external device in an online state, among the plurality of external devices, is configured to control the corresponding first external device based on the operating parameter, and wherein the computer has an operating system, the first program, and the plurality of remote control plug-ins for plugging into the first program, the external devices being sound signal handling devices.

5. A remote control system comprising:

a computer having an operating system, a first program, and a plurality of remote control plug-ins for plugging into the first program for controlling a plurality of external devices connected to the computer, the external devices being sound signal handling devices, the computer being configured to:

read a setup file when a load instruction is detected, the setup file containing first program data specifying a state of the first program and containing one or more operating parameters corresponding to one or more remote control plug-ins to be initiated among one or more available remote-control plug-ins of the plurality of remote control plug-ins;

selectively initiate the one or more remote control plug-ins whose one or more operating parameters are contained in the read setup file;

supply each of the initiated one or more remote control plug-ins with one of the one or more operating parameters contained in the read setup file; and edit content of a first operating parameter of the one or more operating parameters supplied to a first initiated remote control plug-in of the initiated one or more remote control plug-ins in response to an editing operation, wherein, among the initiated one or more remote control plug-ins, the first initiated remote control plug-in corresponding to a first external device in an online state, among the plurality of external devices, is configured to control the corresponding first external device based on the first operating parameter.

6. The remote control system according to claim 5 wherein the computer is further configured to perform a synchronization process to synchronize the operating parameter of the first initiated remote control plug-in and the first operating parameter on the corresponding first external device, and wherein the first initiated remote control plug-in that completes the synchronization process is in the online state to the corresponding first external device of a control target, and the first initiated remote control plug-in in the online state notifies the corresponding first external device in real time, of content of the first operating parameter edited according to the editing operation.

7. The remote control system according to claim 5, wherein the computer is further configured to display icons each corresponding to each of the initiated one or more remote control plug-ins, and wherein, when an operation is applied to a first icon of the displayed icons, the initiated remote control plug-in corresponding to the first icon displays a control screen for use in controlling a corresponding external device of the plurality of external devices, and wherein, when the editing operation is performed on the control screen, content of the first operating parameter of the initiated remote control plug-in corresponding to the first icon is edited according to the editing operation performed on the control screen.

8. A remote control method of controlling a plurality of external devices, when connected to a computer, through a plurality of remote control plug-ins, the remote control method comprising:

reading a setup file when a load instruction is detected, the setup file containing first program data specifying a state of the first program and containing one or more operating parameters corresponding to one or more remote control plug-ins to be initiated among one or more avail able remote-control plug-ins of the plurality of remote control plug-ins;

selectively initiating the one or more remote control plug-ins whose one or more operating parameters are contained in the read setup file indicated by the read setup;

supplying each of the initiated one or more remote control plug-ins with one of the one or more operating parameters contained in the read setup file; and editing content of a first operating parameter of the one or more operating parameters supplied to a first initiated remote control plug-in of the initiated one or more remote control plug-ins in response to an editing operation, wherein, among the initiated one or more remote control plug-ins, the first initiated remote control plug-in corresponding to a first external device in an online state, among the plurality of external devices, is configured to control the corresponding first external device based on the first operating parameter, and wherein the computer has an operating system, the first program, and the plurality of remote control plug-ins for plugging into the first program, the external devices being sound signal handling devices.

9. The remote control system according to claim 1, wherein the first program is a workspace program or music software.

10. The remote control method according to claim 4, wherein the first program is a workspace program or music software.

11. The remote control system according to claim 5, wherein the first program is a workspace program or music software.

12. The remote control method according to claim 8, wherein the first program is a workspace program or music software.

13. A non-transitory recording medium storing software, which when executed by a computer, cause the computer to perform a remote control method of controlling a plurality of external devices, when connected to the computer, through a plurality of remote control plug-ins, the remote control method comprising:

selectively initiating one or more remote control plug-ins among one or more available remote control plug-ins of the plurality of remote control plug-ins;

editing content of an operating parameter in response to an editing operation, the operating parameter being used by an initiated remote control plug-in for controlling one of the plurality of external devices;

collecting content of the operating parameter from each of the initiated one or more remote control plug-ins when a save instruction is detected; and combining a first program parameter representing a state of the first program with the collected content of the operating parameter from each of the initiated one or more remote control plug-ins to thereby produce a setup file, and saving the setup file on the recording medium or another recording medium, wherein, among the initiated one or more remote control plug-ins, a first initiated remote control plug-in corresponding to a first external device in an online state, among the plurality of external devices, is configured to control the corresponding first external device based on the operating parameter, and wherein the computer has an operating system, the first program, and the plurality of remote control plug-ins for plugging into the first program, the external devices being sound signal handling devices.

14. A non-transitory recording medium storing software, which when executed by a computer, cause the computer to perform a remote control method of controlling a plurality of external devices, when connected to a computer, through a plurality of remote control plug-ins, the remote control method comprising:

reading a setup file when a load instruction is detected, the setup file containing first program data specifying a state of the first program and containing one or more operating parameters corresponding to one or more remote control plug-ins to be initiated among one or more available remote-control plug-ins of the plurality of remote control plug-ins;

selectively initiating the one or more remote control plug-ins whose one or more operating parameters are contained in the read setup file;

supplying each of the initiated one or more remote control plug-ins with one of the one or more operating parameters contained in the read setup file; and editing content of a first operating parameter of the one or more operating parameters supplied to a first initiated remote control plug-in of the initiated one or more remote control plug-ins in response to an editing operation, wherein, among the initiated one or more remote control plug-ins, the first initiated remote control plug-in corresponding to a first external device in an online state, among the plurality of external devices, is configured to control the corresponding first external device based on the first operating parameter, and wherein the computer has an operating system, the first program, and the plurality of remote control plug-ins for plugging into the first program, the external devices being sound signal handling devices.

* * * * *